(12) United States Patent
Katakura et al.

(10) Patent No.: US 7,042,736 B2
(45) Date of Patent: May 9, 2006

(54) STORAGE APPARATUS AND SHIELDING METHOD FOR STORAGE APPARATUS

(75) Inventors: Yasuyuki Katakura, Odawara (JP); Yasuji Morishita, Odawara (JP); Shinichi Nishiyama, Ninomiya (JP); Yoshikatsu Kasahara, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 10/774,534

(22) Filed: Feb. 10, 2004

(65) Prior Publication Data

US 2005/0110047 A1 May 26, 2005

(30) Foreign Application Priority Data

Nov. 20, 2003 (JP) .............................. 2003-390210

(51) Int. Cl.
*H05K 7/14* (2006.01)

(52) U.S. Cl. ...................... 361/797; 361/799; 361/800

(58) Field of Classification Search ................ 361/796, 361/797, 799, 800
See application file for complete search history.

(56) References Cited

U.S. PATENT DOCUMENTS

| | | |
|---|---|---|
| 4,376,920 A | 3/1983 | Smith |
| 4,642,417 A | 2/1987 | Ruthrof et al. |
| 5,033,091 A | 7/1991 | Bond |
| 5,223,806 A | 6/1993 | Curtis et al. |
| 5,548,082 A | 8/1996 | Palmer |
| 6,185,065 B1 | 2/2001 | Hasegawa et al. |
| 6,310,286 B1 | 10/2001 | Troxel et al. |
| 6,498,890 B1 | 12/2002 | Kimminau |
| 6,686,538 B1 | 2/2004 | Yamamoto |
| 6,920,042 B1 * | 7/2005 | Yuan et al. ................. 361/685 |
| 6,940,730 B1 * | 9/2005 | Berg et al. .................. 361/796 |
| 6,950,895 B1 * | 9/2005 | Bottom ....................... 710/301 |
| 6,963,495 B1 * | 11/2005 | Carullo et al. .............. 361/818 |
| 6,967,282 B1 * | 11/2005 | Tonomura et al. ........ 174/35 R |
| 6,977,817 B1 * | 12/2005 | Suckow et al. ............. 361/715 |
| 2002/0012236 A1 * | 1/2002 | DiMarco ..................... 361/796 |

FOREIGN PATENT DOCUMENTS

JP 11-265233 9/1999

* cited by examiner

*Primary Examiner*—Hung V. Ngo
(74) *Attorney, Agent, or Firm*—Mattingly, Stanger, Malur & Brundidge, P.C.

(57) ABSTRACT

A storage apparatus includes a first rack having electrical conductivity, on which are mounted channel control parts receiving data input/output requests, and disk control parts performing read/write of data from and to disk drives, a second rack having electrical conductivity, on which are mounted disk drives, and relay parts for relaying communications between the disk drives and disk control parts; and communication cables for connecting disk control parts to relay parts. The communication cables include a transmission medium through which to transmit data, a first conductor having electrical conductivity and surrounding the transmission medium, a second conductor having electrical conductivity and surrounding the first conductor, and a covering surrounding the second conductor. The first conductor is connected to ground potential supply circuits provided in at least either disk control parts or relay parts, and the second conductor is connected to at least one of the first and second racks.

16 Claims, 25 Drawing Sheets

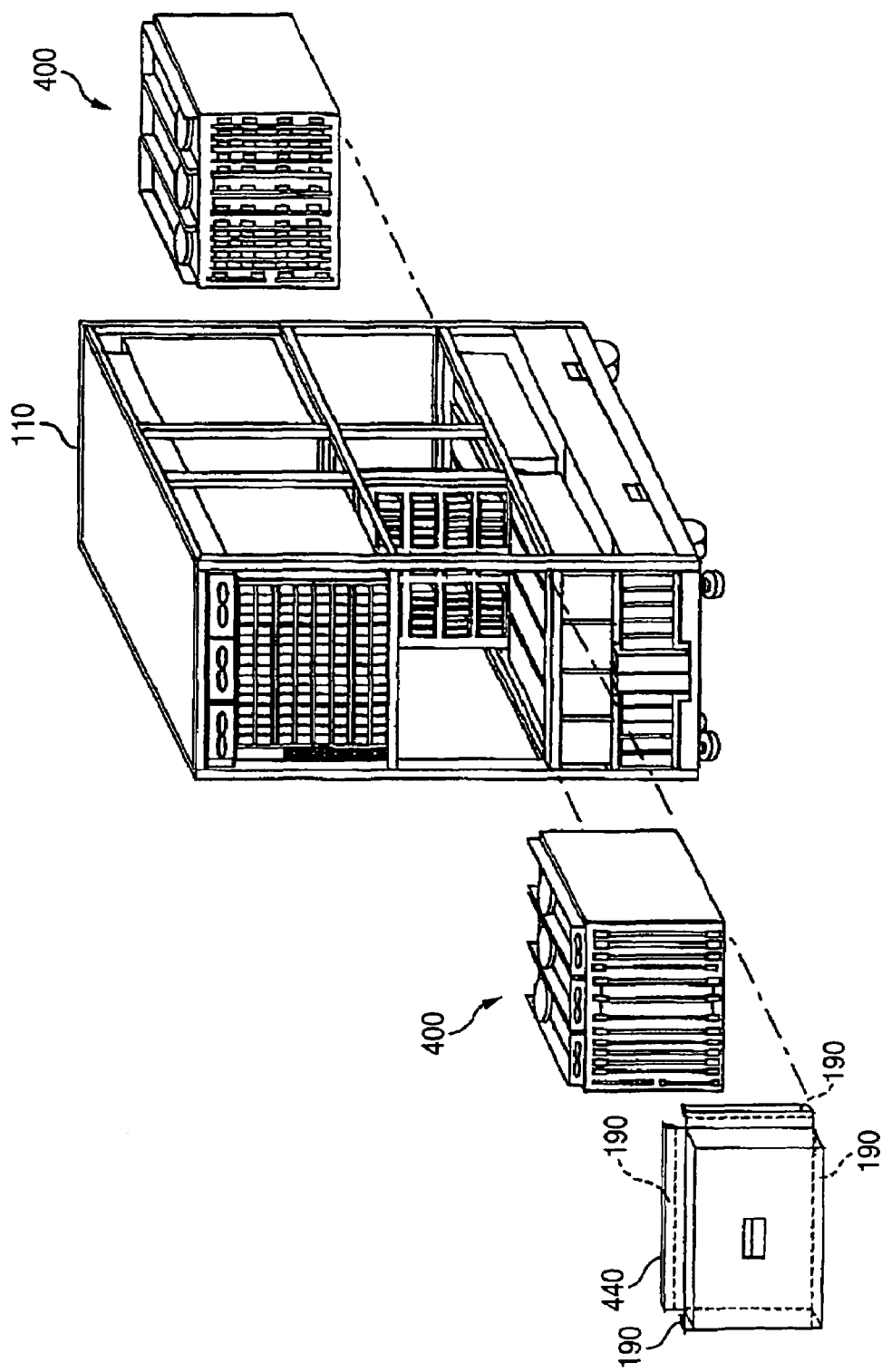

STORAGE APPARATUS AND SHIELDING METHOD FOR STORAGE APPARATUS

CROSS-REFERENCES TO RELATED APPLICATIONS

This application relates to and claims priority from Japanese Patent Application No. 2003-390210, filed on Nov. 20, 2003, the entire disclosure of which is incorporated herein by reference.

BACKGROUND OF THE INVENTION

The present invention relates to a storage apparatus and to a shielding method for a storage apparatus.

With the recent advancement of information technology, storage apparatuses and information processing devices, which exist in connection with storage apparatuses, are becoming higher and higher in performance. To cope with increases in performance, the storage apparatuses and the information processing devices have adopted various techniques for preventing electromagnetic waves from leaking to the outside or entering from the outside.

The storage apparatuses are required to have extremely high reliability, and so positive interception of electromagnetic waves is particularly important. For this reason, storage apparatuses adopt various shielding structures for intercepting electromagnetic waves.

[Patent Document 1] JP-A-11-265233

SUMMARY OF THE INVENTION

A multiplicity of electronic component parts are incorporated at high density in a storage apparatus. Therefore, with respect to a storage apparatus, it is strongly desired to realize simplified manufacture, improved maintainability, reduced manufacturing cost and a reduced number of component parts, while strengthening the interception of electromagnetic waves.

The present invention has been made in view of the above-described problem and mainly provides a storage apparatus and a shielding method for a storage apparatus.

The invention provides a storage apparatus which includes a storage control section including a first rack having electrical conductivity, and channel control parts and disk control parts housed in the first rack. The channel control parts are communicably connected to an information processing apparatus and are constructed to receive a data input/output request from the information processing apparatus. The disk control parts are communicably connected to hard disk drives for storing data and are constructed to perform read/write operations on data from and to the hard disk drives in response to a data input/output request from the information processing apparatus.

The storage apparatus further includes a storage drive section including a second rack having electrical conductivity, the aforementioned hard disk drives, and relay parts for relaying communications between the hard disk drives and the disk control parts. The hard disk drives and the relay parts are housed in the second rack.

In the storage apparatus, communication cables are provided for communicably connecting the disk control parts to the relay parts. Each of the communication cables includes a transmission medium through which to transmit data to be read or written by the disk control parts, a first conductor having electrical conductivity and surrounding the transmission medium with an insulator interposed therebetween, a second conductor having electrical conductivity and surrounding the first conductor with an insulator interposed therebetween, and an electrically nonconductive covering surrounding the second conductor. The first conductor is electrically conductibly connected to ground potential supply circuits provided in at least either the disk control parts or the relay parts, and the second conductor is electrically conductibly connected to at least one of the first rack and the second rack.

Other problems as disclosed in the present application, as well as methods for solving the problems, will become apparent from the following description of various embodiments of the invention, taken in conjunction with the accompanying drawings.

According to the invention, it is possible to provide a storage apparatus and a shielding method for a storage apparatus.

BRIEF DESCRIPTION OF THE DRAWINGS

FIG. 26 is a developed perspective view showing the state in which a cover is provided on a control box according to the invention;

DESCRIPTION OF THE PREFERRED EMBODIMENTS (External Appearance of Disk Array Apparatus)

An example of the external appearance and construction of a storage apparatus (hereinafter referred to also as a disk array apparatus) 100 according to one embodiment of the invention will be described with reference to FIG. 1.

Figure 1:
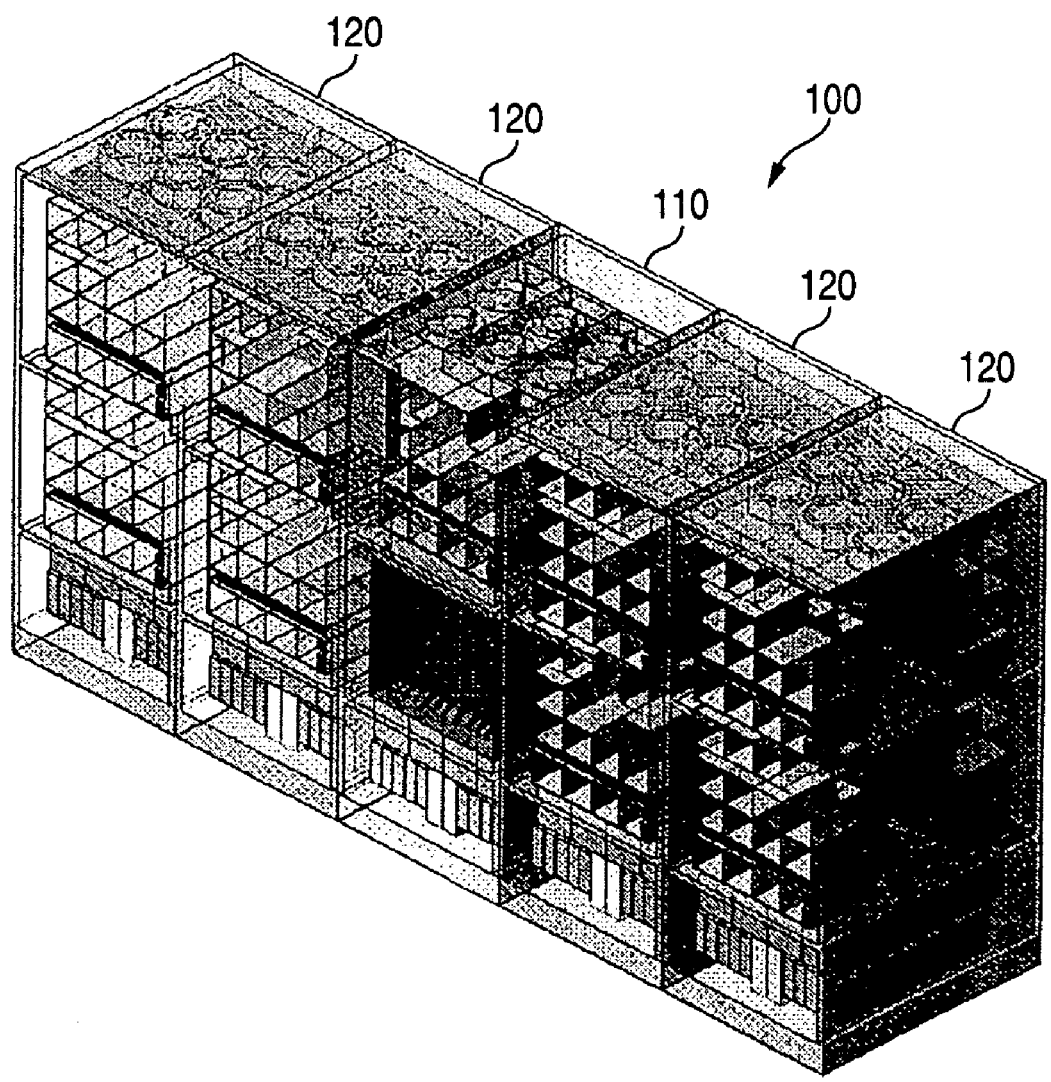
FIG. 1 is a perspective view showing the external appearance and construction of a storage apparatus according to an embodiment of the invention.

The disk array apparatus 100 shown in FIG. 1 includes a control section (a storage control section) 110 and drive sections (storage drive sections) 120. In the example shown in FIG. 1, the control section 110 is disposed in the middle of the disk array apparatus 100, and the drive sections 120 are disposed on the right and left sides of the control section 110.

The control section 110 is responsible for controlling the entire disk array apparatus 100. As will be described later in detail, logical parts 420 that are responsible for controlling the entire disk array apparatus 100 and disk drive units 310 for storing data are disposed on the front and rear sides of the control section 110. Disk drive units 310 are disposed on the front and rear sides of the drive sections 120.

The disk array apparatus 100 contains various electronic devices at a high density so that its large data storage capacity and a reduction in size can be compatibly realized. The disk array apparatus 100 is also provided with various constructions for intercepting electromagnetic waves from the outside. Detailed constructions of the control section 110 and the drive sections 120 will be described below with reference to FIGS. 2A through 5.

(Control Section)

Figure 2A:
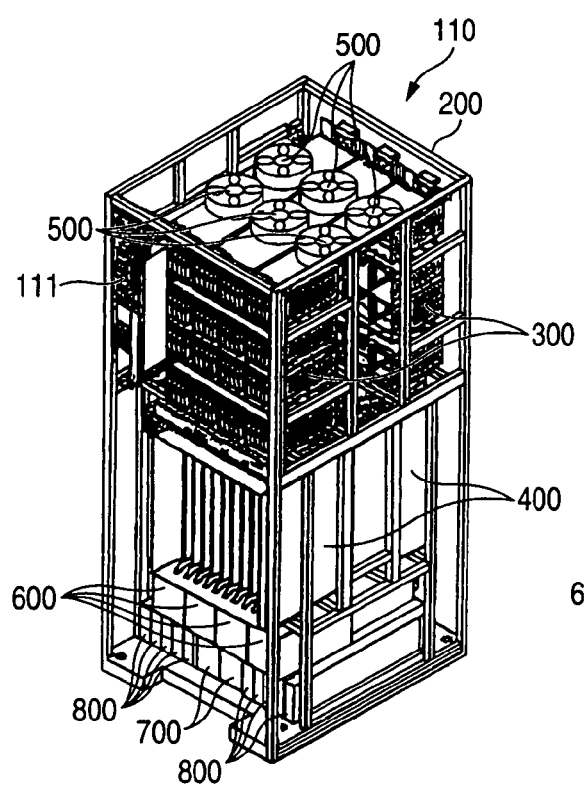
FIGS. 2A and 2B are perspective views showing the external appearance and construction of a typical control section according to the invention, FIG. 2A being a front perspective view as seen from the right and FIG. 2B being a rear perspective view as seen from the left.
Figure 2B:
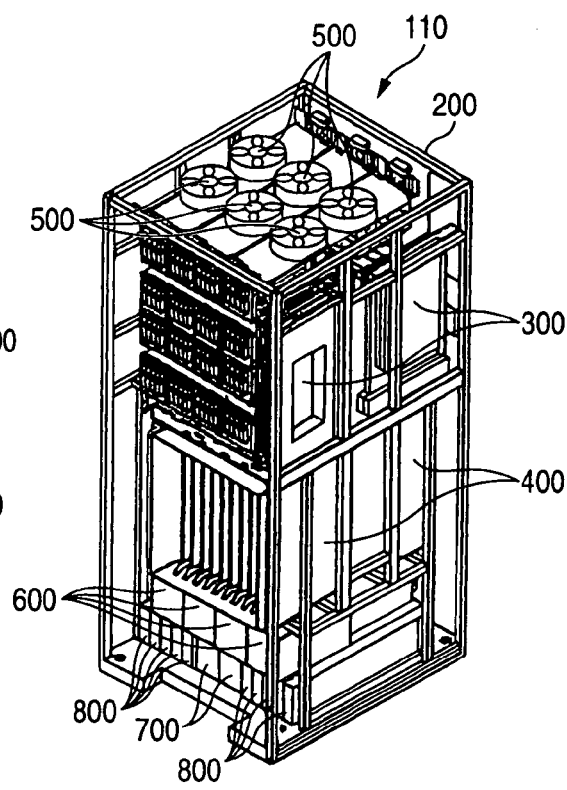
Figure 4:
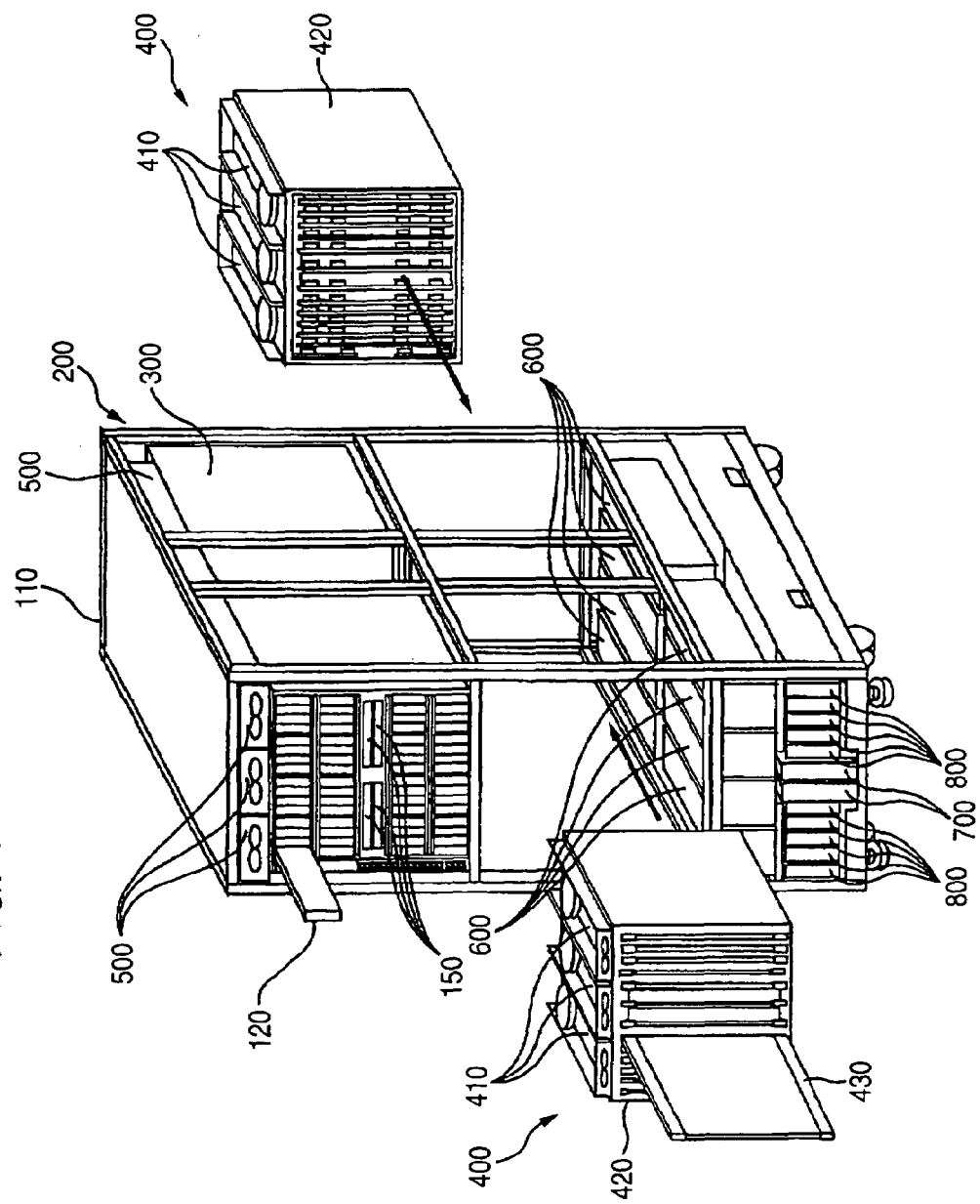
FIG. 4 is a perspective view showing the state in which control boxes are housed in the control section according to the invention.

FIGS. 2A, 2B and 4 show the construction of the control section 110. FIG. 2A shows a front perspective view of the external appearance of the control section 110, as seen from the right direction, and FIG. 2B shows a rear perspective view of the external appearance of the control section 110, as seen from the left direction. The external appearance shown in FIG. 2A corresponds to the front perspective view of the external appearance seen from the right direction, while the external appearance shown in FIG. 2B corresponds to the rear perspective view of the external appearance seen from the left direction.

The control section 110 has an approximately rectangular parallelepipedic framework (a first rack) 200 having electrical conductivity, in which disk drive modules (disk boxes) 300, logical modules (control boxes) 400, batteries 800, AC-BOXES 700, AC/DC power sources 600, fans 500 and an operator panel 111 are housed. The framework 200 may be made of, for example, a metal having electrical conductivity.

Figure 5:
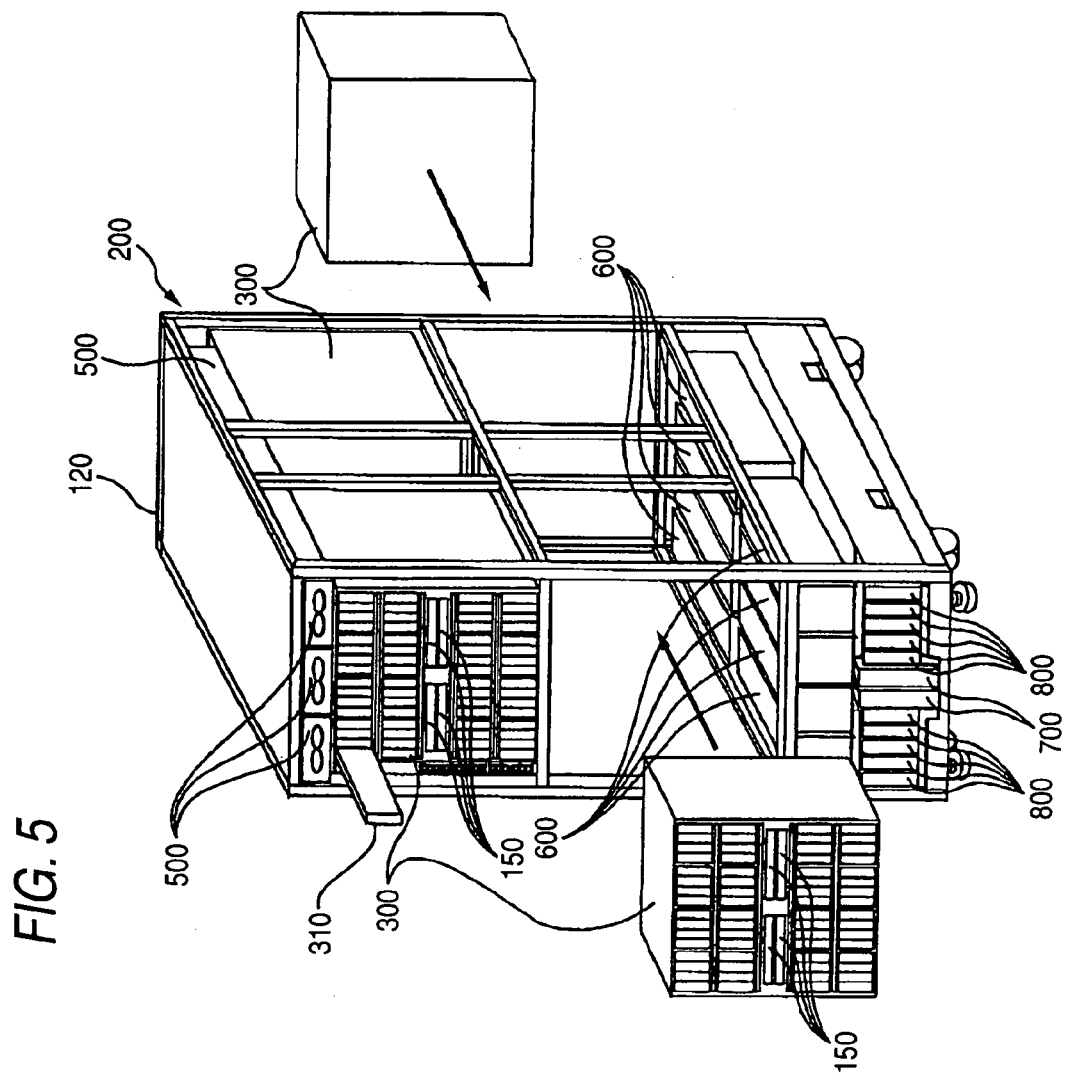
FIG. 5 is a perspective view showing the state in which disk drive boxes are housed in one of the drive sections according to the invention.

Each of the disk drive modules 300 has an approximately rectangular parallelepipedic shape as well as electrical conductivity. Each of the disk drive modules 300 may be made of, for example, a metal having electrical conductivity. The disk drive modules 300 are housed in the upper portion of the framework 200 so that the disk drive modules 300 are electrically conductibly connected to the framework 200. A plurality of disk drive units 310 are housed in each of the disk drive modules 300 in such a manner that each of the disk drive units 310 is adjacent to the next one and is removably inserted in the disk drive modules 300, as seen in FIG. 5, and Fibre Channel switches (FSWs or relay parts) 150 are also housed in each of the disk drive modules 300 so that each of the Fibre Channel switches 150 can be removably inserted in the disk drive modules 300. The disk drive modules 300 and the framework 200 may be arranged to conduct electricity therebetween by being connected to each other by electrical cables, or by being brought into simple physical contact with each other.

Each of the disk drive units 310 is constructed in such a manner that a disk drive (hard disk drive) for storing data is housed in a canister. The FSWs 150 will be described later.

Each of the logical modules 400 has electrical conductivity and an approximately rectangular parallelepipedic shape. The logical modules 400 may be made of, for example, a metal having electrical conductivity. The logical modules 400 are housed in the middle portion of the framework 200 so that the logical modules 400 are electrically conductibly connected to the framework 200. The logical modules 400 and the framework 200 may be arranged to conduct electricity therebetween by being connected to each other by electrical cables, or by being brought into simple physical contact with each other.

Each of the logical modules 400 is provided with a logical part 420 and logical module fans 410, as seen in FIG. 4.

Figure 6:
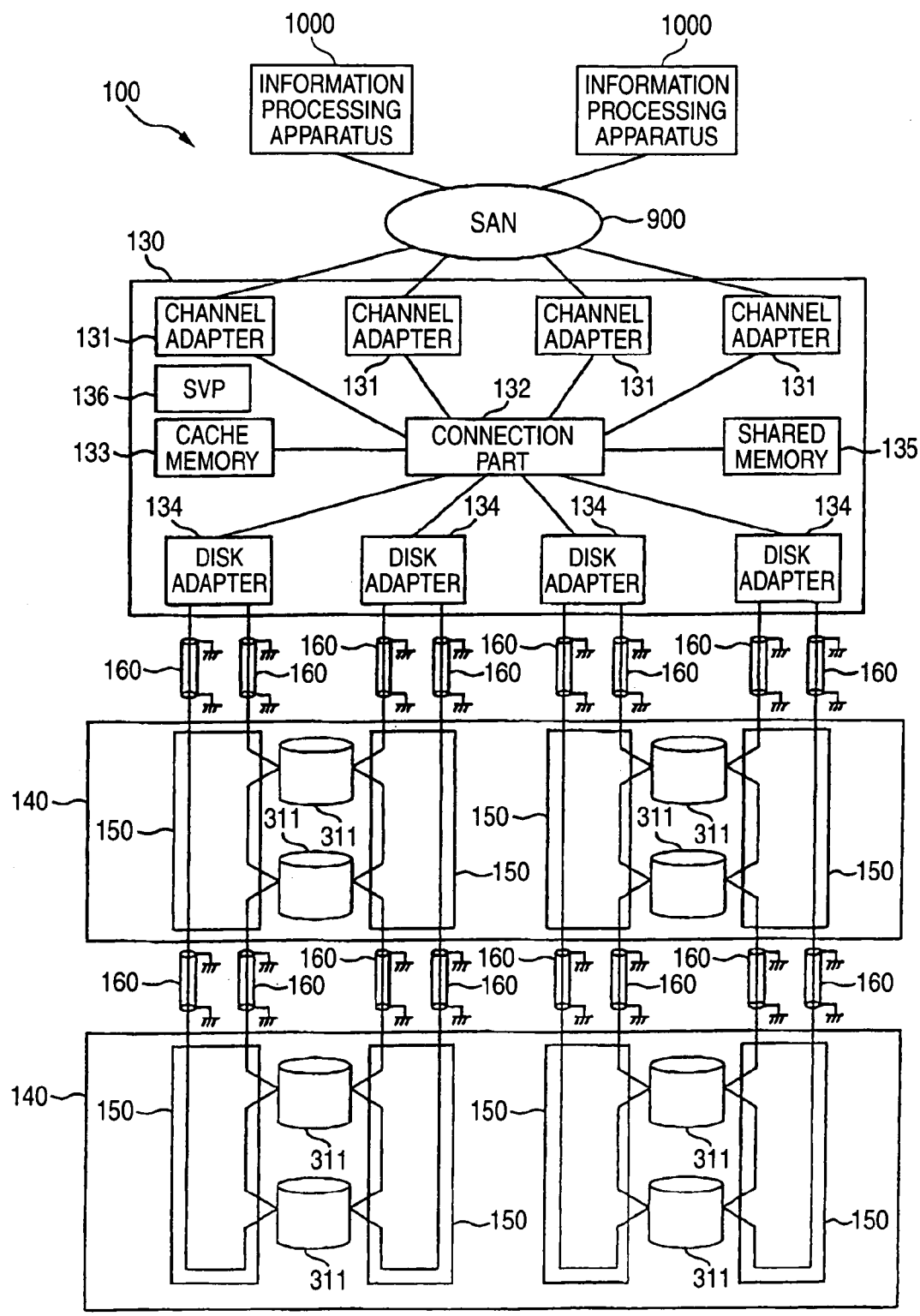
FIG. 6 is a block diagram showing an example of the internal construction of the storage apparatus according to the invention.

Control boards 430 provided with various functions for controlling read/write of data from and to disk drives 311 are housed in the logical part 420 so that each of the control boards 430 is removably inserted in the logical part 420. Although the details thereof will be described later, as shown in FIG. 6, each of the circuit boards 430 of the logical part 420 includes channel adapters (channel control parts which are communicably connected to an information processing apparatus 1000 and receive a data input/output request from the information processing apparatus 1000) 131, a cache memory 133, a shared memory 135, a connection part 132, and disk adapters (disk control parts which are communicably connected to hard disk drives for storing data and perform read/write of data from and to the hard disk drives in response to a data input/output request) 134.

The logical module fans 410 are devices for producing cooling air to cool the logical part 420. Cooling air enters the inside of the framework 200 from the front side of the logical modules 400 through the gap between each of the circuit boards 430 of the logical parts 420, and it is discharged from the ceiling portion of the framework 200 to the outside thereof by being drawn by the logical module fans 410 and fans 500.

The batteries 800, the AC-BOXES 700 and the AC/DC power sources 600 are housed in the lower portion of the framework 200. The batteries 800, the AC-BOXES 700 and the AC/DC power sources 600 are hereinafter referred to also as a power source part.

The AC-BOXES 700 constitute inlets for introducing alternating current power into the disk array apparatus 100, and they function as a breaker. Alternating current power introduced into the AC-BOXES 700 is supplied to the AC/DC power sources 600.

The AC/DC power sources 600 are power source units for converting the introduced alternating current voltage to direct current voltage and for outputting direct current voltage to be supplied to the logical parts 420, the disk drive units 310 and the like.

The batteries 800 are power storage units for supplying direct current power to various devices provided in the control section 110 instead of the AC/DC power sources 600 during a failure in the supply of direct current power from the AC/DC power sources 600, such as a power failure or an abnormality occurring in the AC/DC power sources 600.

The fans 500 are disposed on the ceiling portion of the framework 200. The fans 500 are units for producing cooling air to cool the control section 110. Cooling air enters the inside of the framework 200 from the front side of each of the disk drive modules 300 and the logical modules 400, and it is discharged to the outside of the framework 200 by being drawn by the fans 500.

The operator panel 111 is disposed on the front side of the framework 200. The operator panel 111 is a unit for accepting operation inputs from an operator who performs maintenance and management on the disk array apparatus 100.

(Drive Section)

Figure 3:
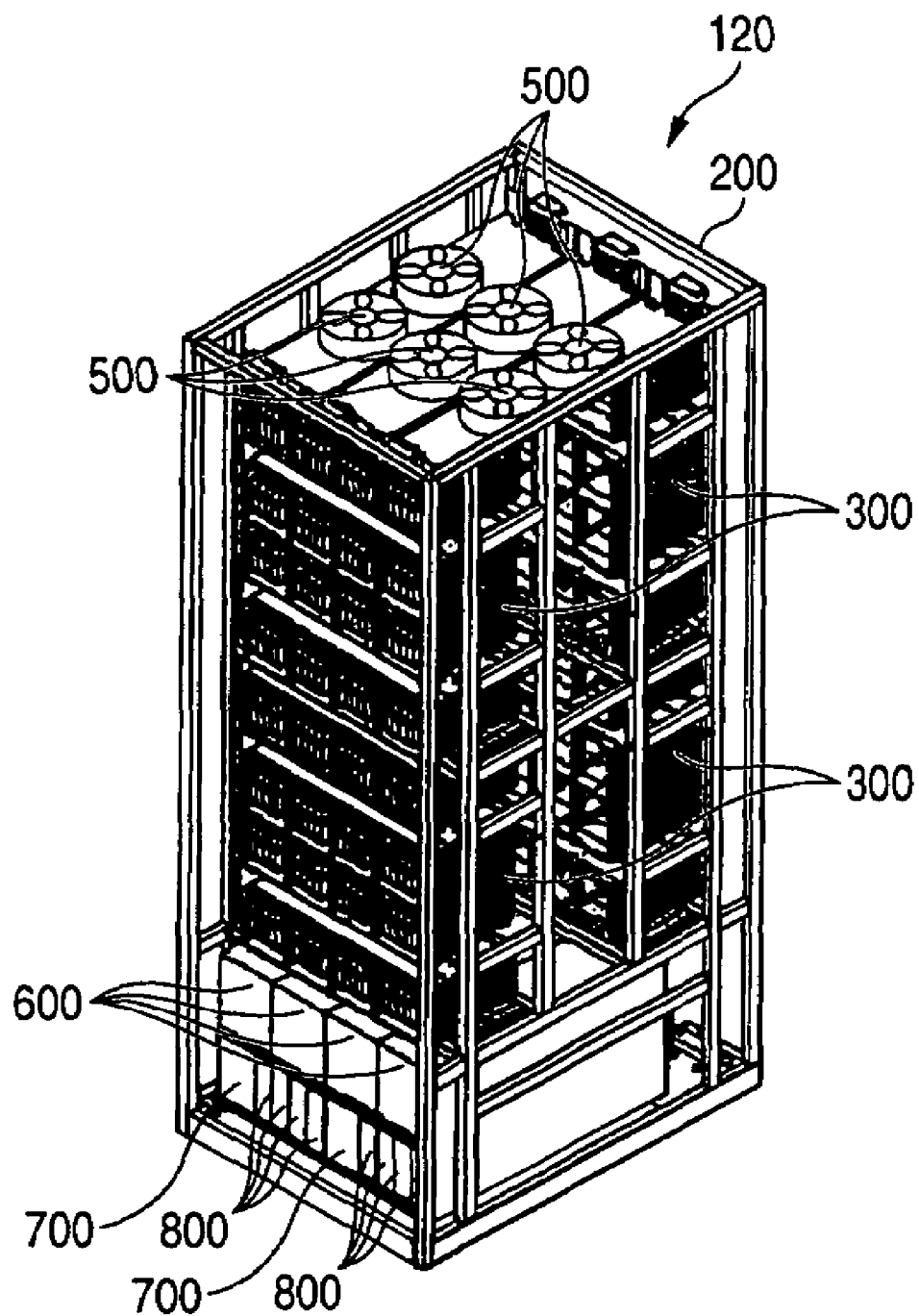
FIG. 3 is a front perspective view showing the external appearance of a typical one of the drive sections according to the invention.

FIGS. 3 and 5 show the construction of a typical one of the drive sections 120. FIG. 3 is a front perspective view showing the external appearance of one of the drive sections 120, as seen from the right direction.

The drive section 120 shown in FIG. 3 has an approximately rectangular parallelepipedic framework (a second rack) 200 having electrical conductivity, in which disk drive modules (disk boxes) 300, batteries 800, AC-BOXES 700, AC/DC power sources 600 and fans 500 are housed. The devices provided in the drive section 120 are the same as the corresponding devices provided in the control section 110.

It is to be noted that the framework 200 used in the control section 110 and the framework 200 used in each of the drive sections 120 can be constructed with the same structure. In this case, if the logical modules 400 are housed in the middle portion of the framework 200, it is possible to provide the control section 110, whereas if the disk drive modules 300 are housed in the middle portion of the framework 200, it is possible to provide the drive section 120.

(Construction of Disk Array Apparatus)

FIG. 6 is a block diagram showing an example of the internal construction of the disk array apparatus 100 according to this embodiment of the invention. The disk array apparatus 100 is communicably connected to an information processing apparatus 1000 via a SAN (Storage Area Network) 900.

The information processing apparatus 1000 is an information apparatus, such as a computer having a CPU (Central Processing Unit) and memories. Various functions can be realized by various programs being executed by the CPU provided in the information processing apparatus 1000. The information processing apparatus 1000 can be used as, for example, a main computer in an ATM cash dispenser system for banks or a seat reservation system for airlines.

The SAN 900 is a network for exchange of data between the information processing apparatus 1000 and the disk array apparatus 100. In general, the communication performed between the information processing apparatus 1000 and the disk array apparatus 100 via the SAN 900 obeys the Fibre Channel Protocol. A data input/output request is transmitted from the information processing apparatus 1000 to the disk array apparatus 100 in accordance with the Fibre Channel Protocol.

The disk array apparatus 100 according to this embodiment of the invention is provided with a disk array control part 130 and disk array drive parts 140. The disk array control part 130 is arranged in the control section 110, and the disk array drive parts 140 are arranged in the control section 110 or the drive sections 120. Namely, the control section 110 is provided with the disk array control part 130 and the disk array drive parts 140, and the respective drive sections 120 are provided with the disk array drive parts 140.

The disk array control part 130 receives a data input/output request from the information processing apparatus 1000, and performs read/write of data from and to the disk drives 311 provided in the disk array drive parts 140.

The disk array control part 130 includes the channel adapters 131, the cache memory 133, the connection part 132, the shared memory 135, the disk adapters (hereinafter referred to also as DKFs) 134, and a management terminal (hereinafter referred to also as an SVP) 136. The channel adapters 131, the cache memory 133, the connection part 132, the shared memory 135 and the disk adapters 134 are constructed on the circuit boards 430 which constitute each of the logical parts 420 shown in FIG. 4.

(Channel Adapter)

The channel adapters 131, which are communicably connected to the information processing apparatus 1000, receive a data input/output request from the information processing apparatus 1000 and perform exchange of data with the information processing apparatus 1000.

Figure 29:
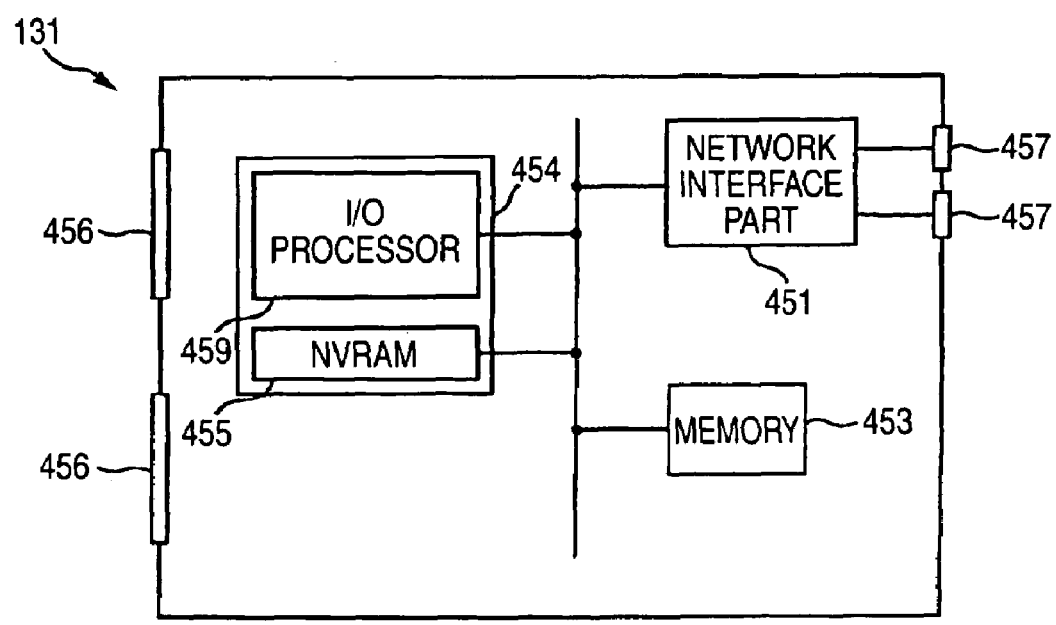
FIG. 29 is a block diagram showing the construction of a channel adapter according to the invention.

The hardware construction of one of the channel adapters 131 is shown in FIG. 29. As shown in FIG. 29, the hardware of each of the channel adapters 131 is constructed as part of one unit board provided with a circuit board. Each of the channel adapters 131 includes a network interface part 451, a memory 453, an input/output control part 454, an I/O (Input/Output) processor 459, a NVRAM (Non-Volatile RAM) 455, a board-connecting connector 456, and a communication connector 457. Other circuits similar to those of general electronic circuits, such as a voltage supply circuit and a ground potential supply circuit, are provided on the circuit board of each of the channel adapters 131.

The network interface part 451 is provided with a communication interface for establishing communication with the information processing apparatus 1000. For example, the network interface part 451 receives a data input/output request transmitted from the information processing apparatus 1000 in accordance with the Fibre Channel Protocol. The communication connector 457 is a connector to which a cable, via which the network interface part 451 communicates with the information processing apparatus 1000, is to be connected. The communication connector 457 supports, for example, the Fibre Channel.

The input/output control part 454 is responsible for controlling the entire channel adapter 131, and it performs exchange of data and commands with the disk adapters 134, the cache memory 133, the connection part 132 and the management terminal 136. The input/output control part 454 executes various programs stored in the memory 453, thereby realizing various functions of the channel adapter 131. The input/output control part 454 is provided with the I/O processor 459 and the NVRAM 455. The I/O processor 459 controls the exchange of data and commands. The NVRAM 455 is a non-volatile memory which stores a program responsible for control of the I/O processor 459. The content of the program which is stored in the NVRAM 455 can be written and rewritten from the management terminal 136.

(Cache Memory and Shared Memory)

The cache memory 133 and the shared memory 135 are memories which store data and commands to be exchanged between the channel adapter 131 and the disk adapters 134. For example, if a data input/output request which a channel adapter 131 has received from the information processing apparatus 1000 is a write request, the channel adapter 131 writes the write request to the shared memory 135, and it also writes to the cache memory 133 data received from the information processing apparatus 1000. Then, the corresponding one of the disk adapters 134 reads the data written to the cache memory 133 and writes the read data to the corresponding one of the disk drives 311 in accordance with the write request written to the shared memory 135.

(Connection Part)

The connection part 132 provides interconnections among the channel adapters 131, the shared memory 135, the cache memory 133 and the disk adapters 134. The connection part 132 includes, for example, a crossbar switch.

(Disk Adapter)

Each of the disk adapters 134 is communicably connected to the corresponding ones of the disk drives 311 and performs read/write of data from and to the corresponding ones of the disk drives 311 by communicating therewith. The read/write of data is performed via a communication path which constitutes a loop determined by FC-AL, which is a Fibre Channel Standard (hereinafter referred to also as the FC-AL loop). The communication path includes the disk adapters 134, communication cables 160, the FSWs 150, and the disk drives 311.

The communication between each of the disk adapters 134 and the corresponding ones of the disk drives 311 is relayed by the FSW 150 provided in each of the disk array drive parts 140.

Figure 30:
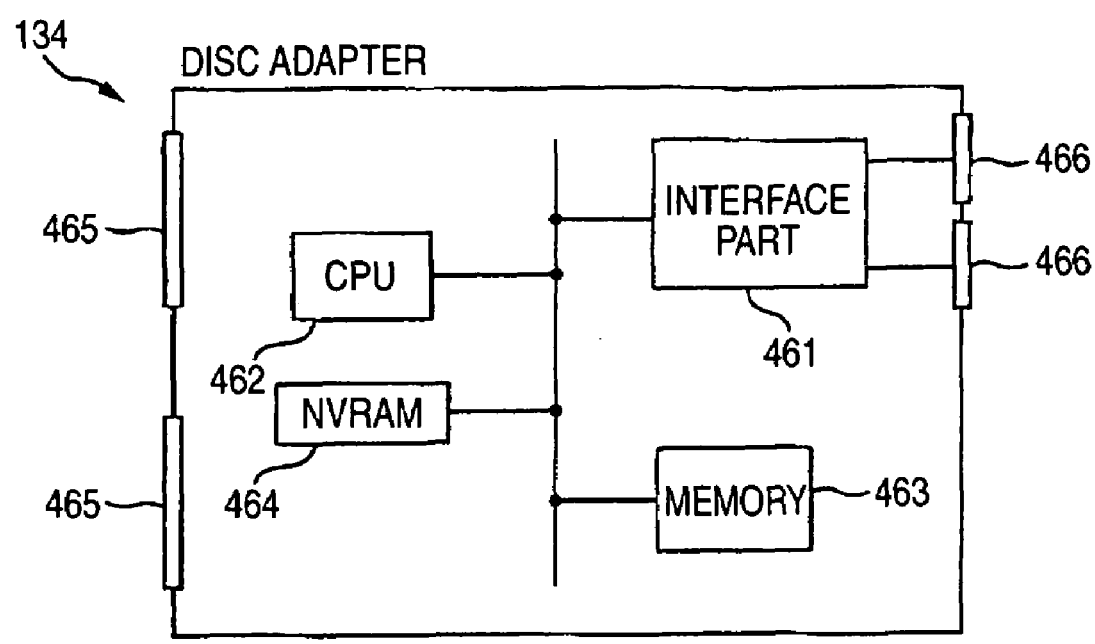
FIG. 30 is a block diagram showing the construction of a disk adapter according to the invention.

The hardware construction of a typical one of the disk adapters 134 is shown in FIG. 30. As shown in FIG. 30, the hardware of each of the disk adapters 134 is constructed as part of one unit board provided with a circuit board. Each of the disk adapters 134 includes an interface part 461, a memory 463, an input/output control part 462, a NVRAM (Non-Volatile RAM) 464, a board-connecting connector 465, and communication connectors 466. Other circuits similar to those of general electronic circuits, such as a source voltage supply circuit and a ground potential supply circuit, are provided on the circuit board of each of the disk adapters 134.

The interface part 461 is provided with a communication interface for establishing communication with the corresponding ones of the disk drives 311. Predetermined ones of the communication cables 160 are connected to the communication connector 466.

The CPU 462 is responsible for controlling the entire disk adapter 134. The CPU 462 executes various programs stored in the memory 463 and the NVRAM 464, thereby realizing various functions of the disk adapter 134.

The NVRAM 464 is a non-volatile memory which stores a program responsible for control of the CPU 462. The content of the program which is stored in the NVRAM 464 can be written and rewritten from the management terminal 136.

(Management Terminal)

The management terminal 136 is an information processing device for effecting maintenance and management of the disk array apparatus 100. The management terminal 136 may be, for example, a notebook computer provided with a display and a keyboard which are constructed in a foldable form. The management terminal 136 is housed in the control section 110. Of course, the management terminal 136 need not be housed in the control section 110, and it may also be, for example, a remote computer connected to the disk array apparatus 100 via a communications network. In addition, the form of the management terminal 136 is not limited to a notebook computer, and it may also be, for example, a desktop computer. Furthermore, the management terminal 136 may be an information processing device for exclusively effecting maintenance and management of the disk array apparatus 100, or it may also be a general-purpose information processing device to which a function for effecting maintenance and management of the disk array apparatus 100 is added.

It is to be noted that the channel adapters 131, the disk adapters 134, the cache memory 133, the shared memory 135 and the connection part 132 need not be separately provided, and they may also be constructed in an integrated form. In addition, a combination of at least any two of these circuits may also be constructed in an integrated form.

(Fibre Channel Switch (FSW))

Figure 7:
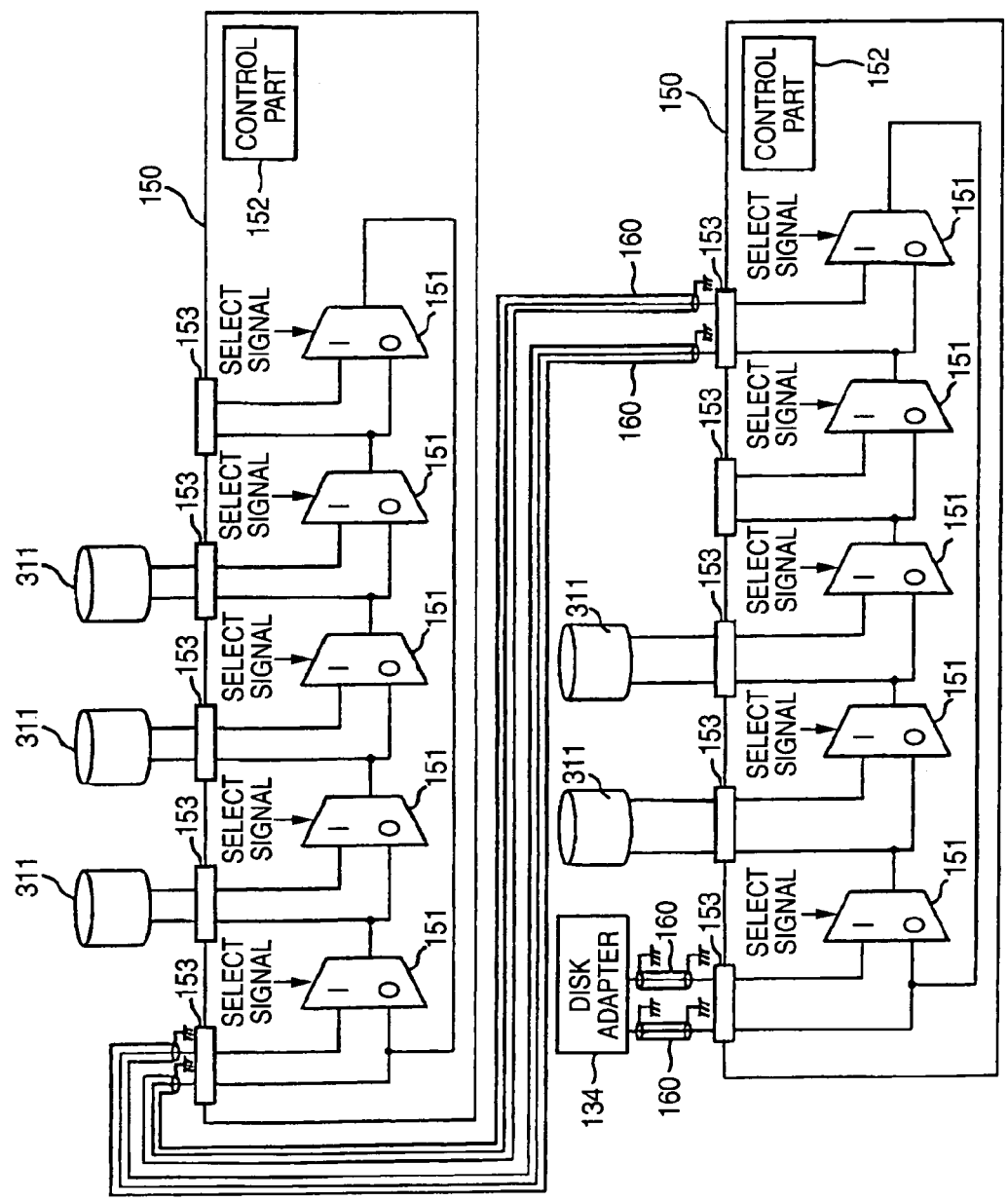
FIG. 7 is a block diagram showing the state in which disk adapters and storage volumes are communicably connected to one another according to the invention.

FIG. 7 shows the construction of each of the FSWs 150 and the FC-AL loop which is formed by one of the disk adapters 134, the FSWs 150, the disk drives 311 and the communication cables 160. The FC-AL loop can be formed by connecting the disk adapter 134 and the disk drives 311 to multiplexers 151 provided in the FSWs 150. In the example shown in FIG. 7, one FC-AL loop is formed across two FSWs 150.

One of the FSWs 150 is communicably connected to the disk adapter 134 and to the other FSW 150 via the communication cables 160 connected to connectors 153. The disk drives 311 are also communicably connected to each of the FSWs 150. The connections between the disk drives 311 and the FSWs 150 can also be provided by, for example, data transfer paths on a circuit board provided inside each of the drive sections 120. Of course, the disk drives 311 and the FSWs 150 may also be connected via the communication cables 160.

A select signal applied to each of the multiplexers 151 is a signal for selecting either the input to a side indicated by "1" or the input to a side indicated by "0" in each of the multiplexers 151. In the case where the disk adapter 134 or any one of the disk drives 311 is connected to each of the multiplexers 151, the select signal is inputted so that the input to the side indicated by "1" of each of the multiplexers 151 is selected. In the case where there is a multiplexer 151 to which nothing is connected, the select signal is inputted to this multiplexer 151 so that the input to the side indicated by "0" is selected. In addition, if a fault is detected in, for example, a particular one of the disk drives 311, the select signal is inputted to a multiplexer 151 to which the particular disk drive 311 is connected, so that the input to the side indicated by "0" is selected. Control of the select signal to be inputted to each of the multiplexers 151 is performed by, for example, the corresponding one of control parts 152.

The control parts 152 exert control on the respective FSWs 150. To control the FSWs 150 is to control the select signals to be inputted to, for example, the respective multiplexers 151. The control of the select signals by the control parts 152 is performed, for example, when a particular one of the disk drives 311 is to be set to a state communicable or non-communicable with the disk adapters 134.

Other circuits similar to those of general electronic circuits, such as a voltage supply circuit and a ground potential supply circuit, are provided on each of the FSWs 150.

Figure 8:
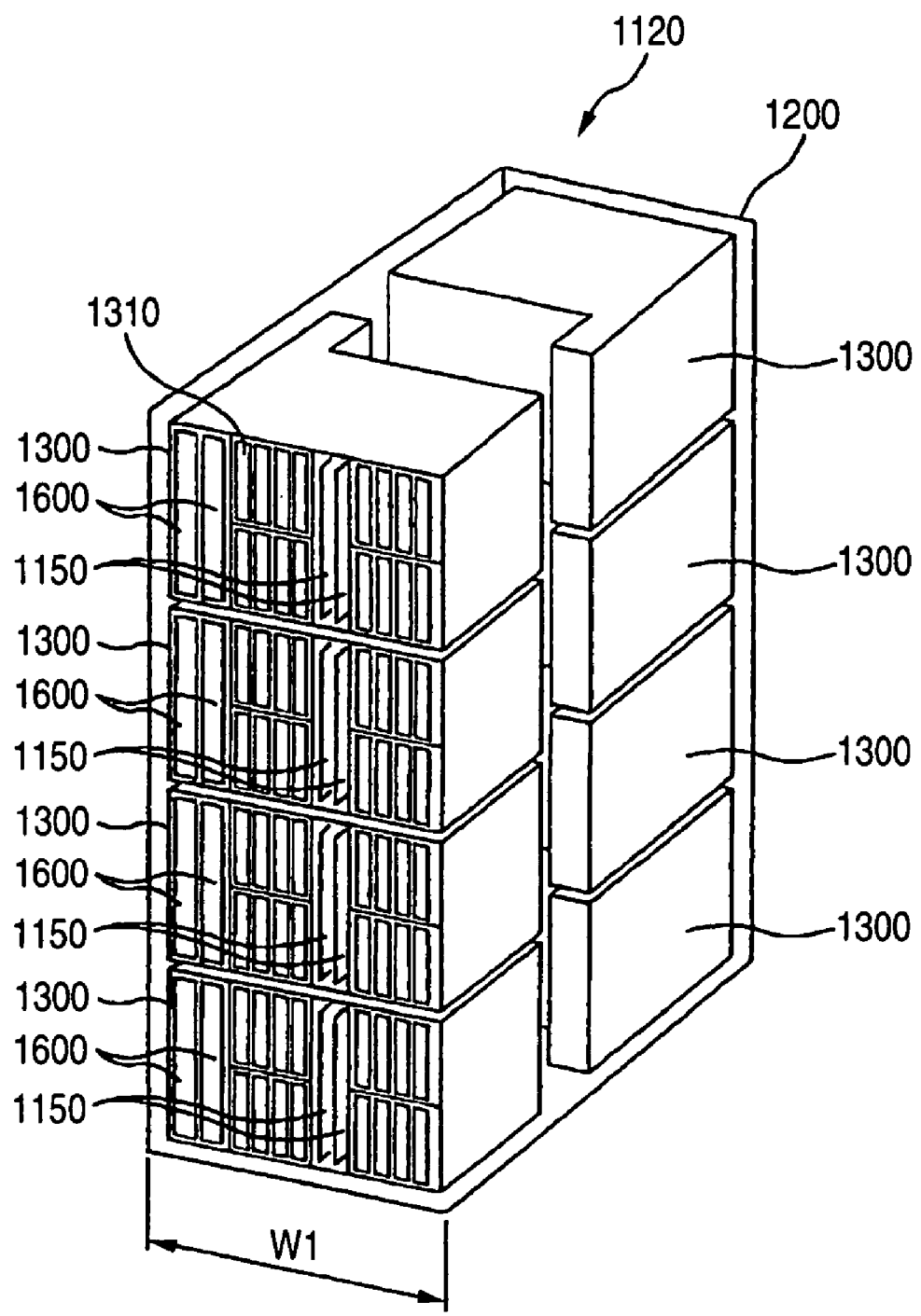
FIG. 8 is a perspective view showing the construction of another drive section.
Figure 9:
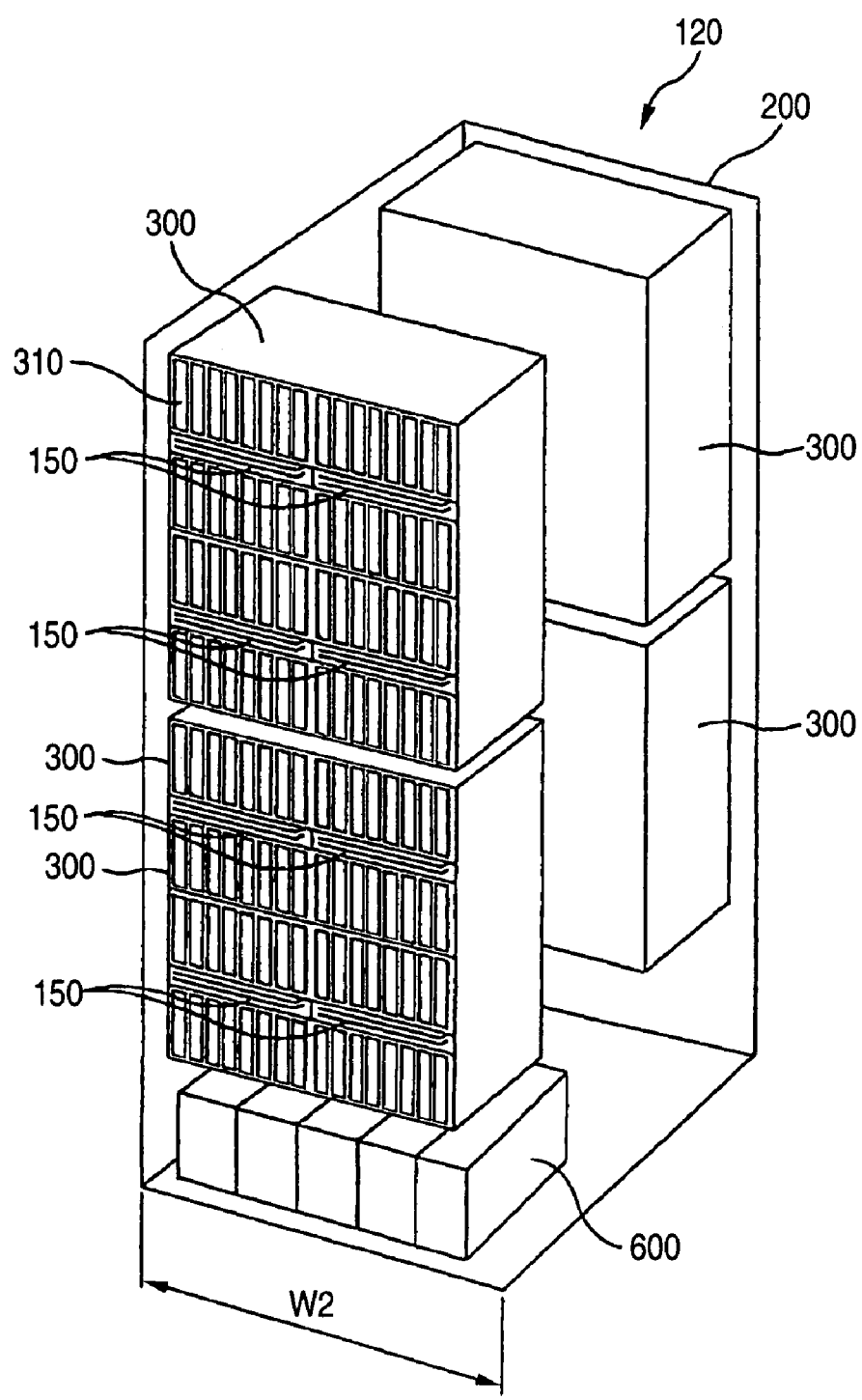
FIG. 9 is a perspective view showing one of the drive sections according to the invention.

As shown in FIG. 9, in each of the drive sections 120 according to this embodiment of the invention, the AC/DC power sources 600 are housed in the lower portion of the framework 200, and some of the FSWs 150 are housed between the upper and lower ones of the disk drive units 310 housed in the upper portion of each of the disk drive modules 300, while the other are housed between the upper and lower ones of the disk drive units 310 housed in the lower portion of the same disk drive module 300. On the other hand, in a drive section 1120 of the type shown in FIG. 8, AC/DC power sources 1600 and FSWs 1150 are housed in the state of being juxtaposed to disk drive units 1310 in each disk drive module 1300. In each of the drive sections 120 according to this embodiment, since the arrangement of the FSWs 150 and the AC/DC power sources 600 is contrived as described above, the lateral width W2 of the drive section 120 can be made smaller than the lateral width W1 of the drive section 1120. Accordingly, it is possible to reduce the overall size of the drive section 120.

(External Appearance of Connection from Disk Adapter to Disk Drive)

Figure 10:
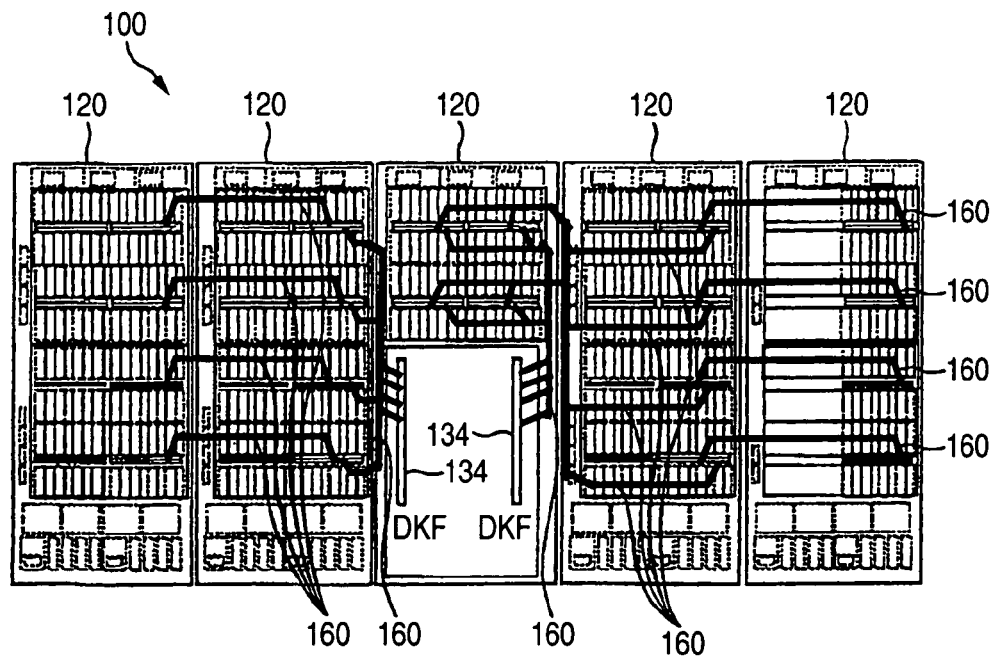
FIG. 10 is a front view showing the external appearance of one example of the connection between disk adapters and hard disk drives according to the invention.
Figure 11:
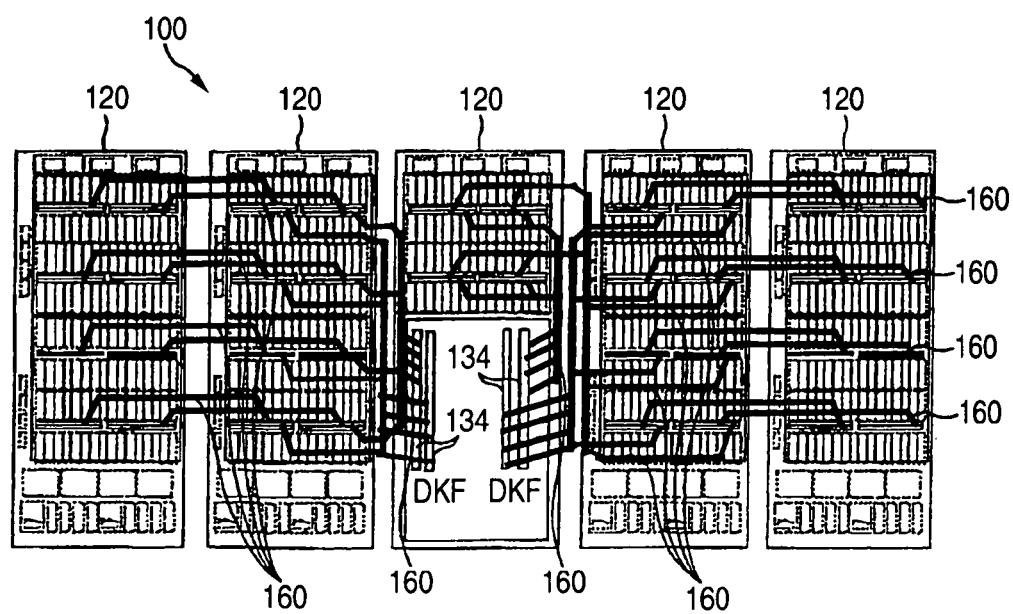
FIG. 11 is a front view showing an external appearance of another example of the connection between disk adapters and hard disk drives according to the invention.
Figure 12:
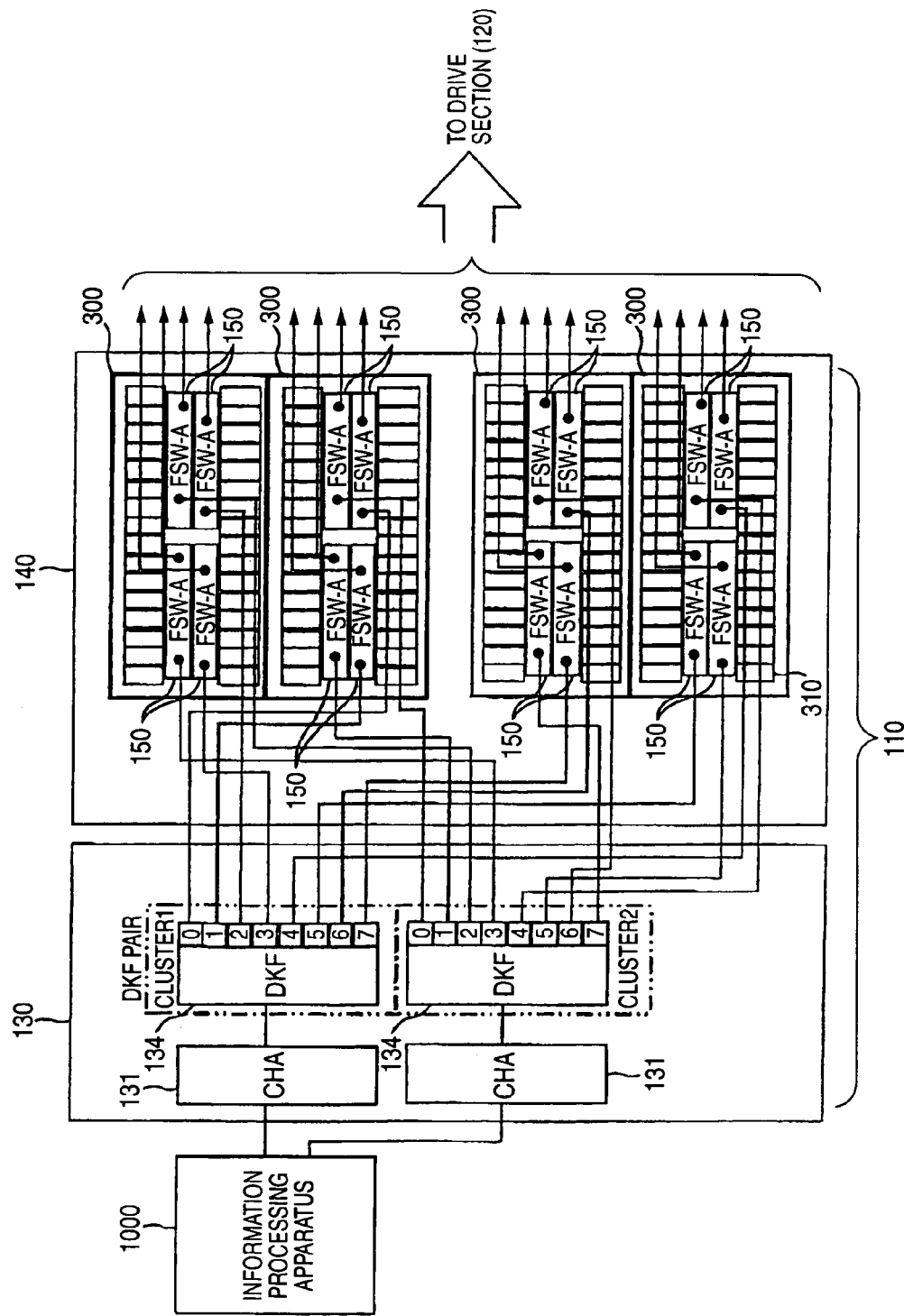
FIG. 12 is a schematic diagram showing the state of connection between disk adapters and hard disk drives according to the invention.
Figure 13:
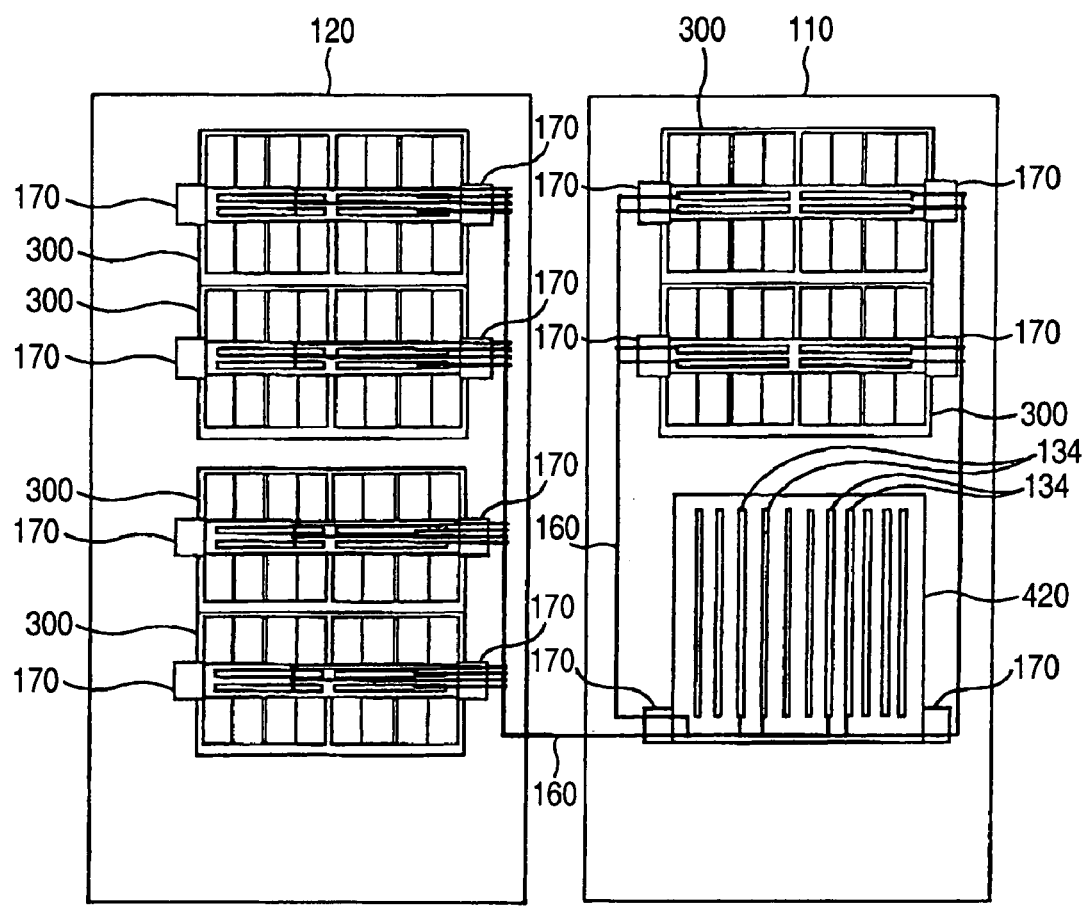
FIG. 13 is a front view showing the external appearance of the state of connection between disk adapters and hard disk drives according to the invention.

FIGS. 10 to 13 show an example of the routing of the communication cables 160 from the disk adapters 134 provided in the control section 110 to the disk drives 311 provided in the control section 110 or the drive sections 120. FIG. 10 is a view showing the external appearance of the routing of the communication cables 160 in the disk array apparatus 100 having a construction provided with two disk adapters 134. FIG. 11 is a view showing the external appearance of a routing of the communication cables 160 in the disk array apparatus 100 having a construction provided with four disk adapters 134. FIG. 12 is a diagram showing the connection relationship between the disk adapters 134 and the FSWs 150. FIG. 13 is a diagram schematically showing a routing of the communication cables 160 from the disk adapters 134 to the disk drives 311.

As shown in FIGS. 10 to 13, the communication cables 160 which communicably interconnect the disk adapters 134, the FSWs 150 and the disk drives 311 are disposed to reach every location in the inside of the disk array apparatus 100.

Accordingly, the disk array apparatus 100 is required to have a structure which does not allow the communication cables 160 to function as an antenna receiving electromagnetic waves radiated from the outside of the disk array apparatus 100.

The communication between the disk adapters 134 and the disk drives 311 is performed in accordance with the Fibre Channel Standard, and the speed of the communication reaches several gigahertz (approximately 1 to 4 gigahertz). In this manner, signals of high frequency flow in the communication cables 160, so that strong electromagnetic waves are radiated from the communication cables 160. Accordingly, the disk array apparatus 100 is required to intercept electromagnetic waves radiated from the communication cables 160.

Strong electromagnetic waves are radiated from not only the communication cables 160, but also from the channel adapters 131, the disk adapters 134, the FSWs 150 and the AC/DC power sources 600. Accordingly, there is also a need for a structure which intercepts the electromagnetic waves that are radiated from these circuit devices, such as the channel adapters 131 and the FSWs.

(Communication Cable)

Figure 14:
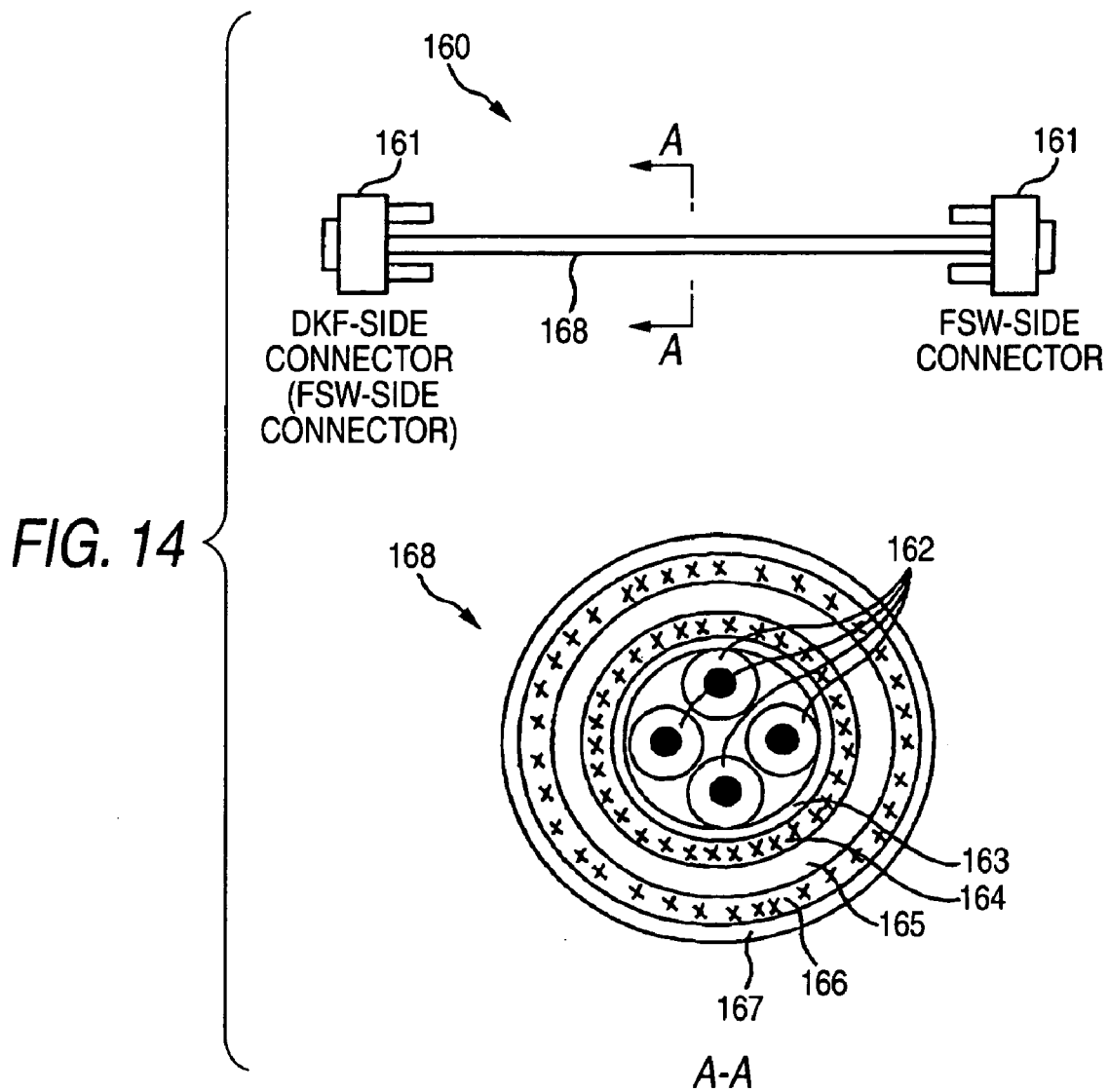
FIG. 14 is a diagram showing a communication cable and a cross-section along line A—A thereof according to the invention.

In the disk array apparatus 100 according to this embodiment of the invention, each of the communication cables 160 has the structure shown in FIG. 14.

The communication cables 160 according to the invention has a structure in which a cable 168 has connectors 161 at its opposite ends. One of the connectors 161 is connected to the communication connectors 466 of any one of the disk adapters 134, while the other is connected to the connector 153 of any one of the FSWs 150. The cable 168 has a transmission medium 162 through which data to be read or written by the connected disk adapter 134 is to be transmitted, a first shield (conductor) 164 which has electrical conductivity and surrounds the transmission medium 162 with an insulator 163 interposed therebetween, a second shield (conductor) 166 which has electrical conductivity and surrounds the first shield 164 with an insulator 165 interposed therebetween, and an electrically nonconductive covering 167 which surrounds the second shield 166.

The transmission medium 162 may be made of, for example, annealed copper wire. The annealed copper wire may be plated with, for example, tin. The insulators 163 and 165 may be made of, for example, vinyl chloride or polyethylene foam. The first shield 164 may have a structure made of, for example, woven annealed copper wire. The first shield 164 may also be made of, for example, polyester tape on which aluminum foil is stuck. The second shield 166 may have a structure made of, for example, woven annealed copper wire. The second shield 166 may also be made of, for example, polyester tape on which aluminum foil is stuck. The covering 167 may be made of, for example, vinyl chloride.

The first shield 164 is electrically conductibly connected to pins of the respective connectors 161 in the inside of the cable 168. When the communication cable 160 is connected to the communication connectors 466 of one of the disk adapters 134 or to the connectors 153 of one of the FSWs 150, the first shield 164 can be electrically conductibly connected to the ground potential supply circuit provided in at least one of the connected disk adapter 134 and FSW 150. Accordingly, the potential of the first shield 164 can be set to ground potential, whereby interception of electromagnetic waves can be effected.

Figure 15:
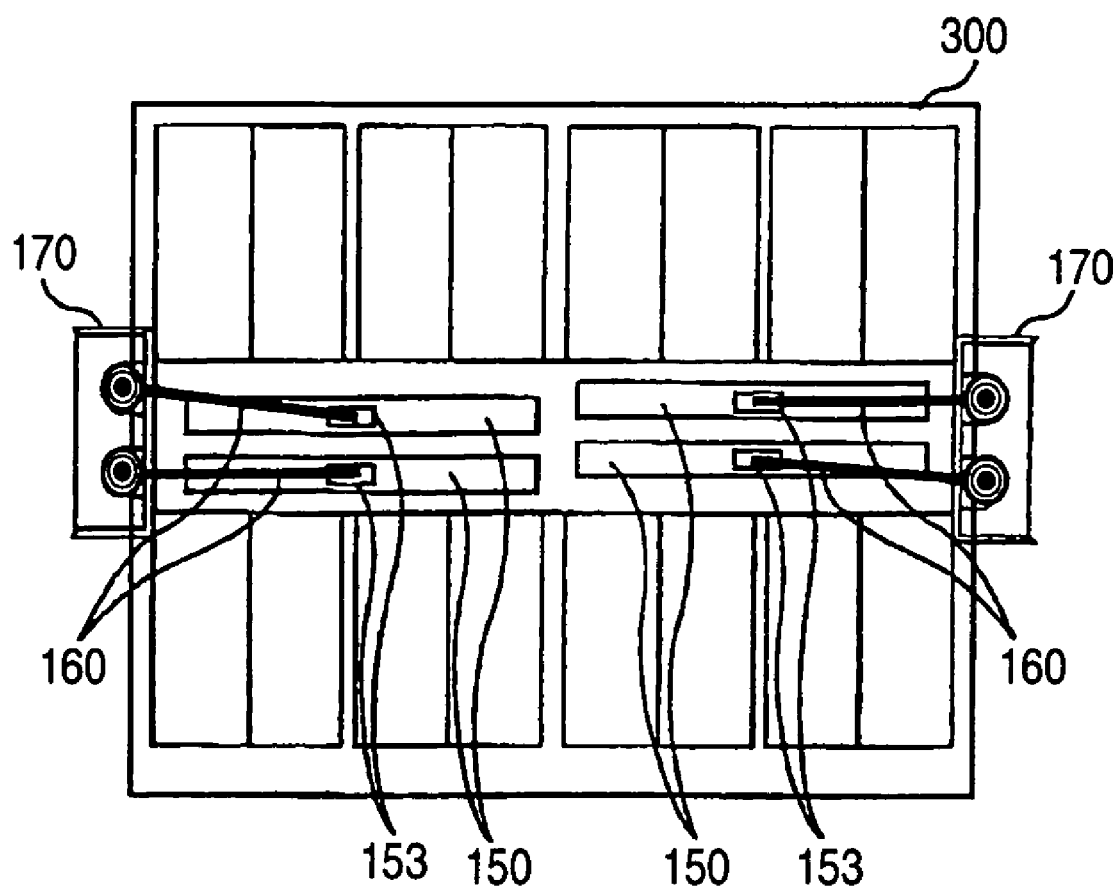
FIG. 15 is a front view showing the state in which Fibre Channel switches according to the invention are fitted.

FIG. 15 shows the state in which the communication cables 160 are respectively connected to the connectors 153 of the FSWs 150. In this embodiment, up to four FSWs 150 can be fitted in one disk drive module 300, as shown in FIG. 15, and as viewed in FIG. 15, two right-hand ones of the FSWs 150 and the other two left-hand ones differ from each other in fitting height. The FSWs 150 according to the embodiment can be removably fitted into the disk drive modules 300, and the respective FSWs 150 are fitted with levers for fixing or releasing them to or from the disk drive module 300. As shown in FIG. 15, the two right-hand FSWs 150 and the two left-hand FSWs 150 are made different from each other in the height of their fitting positions, whereby interference between the levers of the two right-hand FSWs 150 and the levers of the two left-hand FSWs 150 is prevented. Accordingly, the distance between the right-hand and left-hand FSWs 150 can be made narrow and the width W2 of each of the drive sections 120 can be made small.

The second shield 166 of the communication cable 160 is communicably connected to the framework 200. The framework 200 to which the second shield 166 is connected is the framework 200 of the control section 110, the framework 200 of each of the drive sections 120, or the frameworks 200 of both sections 110 and 120. The second shield 166 and the framework 200 can be arranged to conduct electricity therebetween, by being connected to each other by an electrical cable or the like, or by being connected to each other by the use of frame ground supply parts (ground potential supply parts) 170, which will be described below.

FIGS. 6 and 7 show that the communication cables 160 are connected to ground. As described above, this illustration shows that the first shield 164 is communicably connected to at least any one of the ground potential supply circuits provided in the disk adapter 134 and the FSW 150, and the second shield 166 is electrically conductibly connected to the framework 200.

(Frame Ground Supply Part)

As shown in FIGS. 13 and 15, the frame ground supply parts 170 are electrically conductibly fixed to each of the logical modules 400 and the disk drive modules 300. Accordingly, the frame ground supply parts 170 are provided electrically conductibly to at least either the logical modules 400 or the disk drive modules 300.

Figure 16:
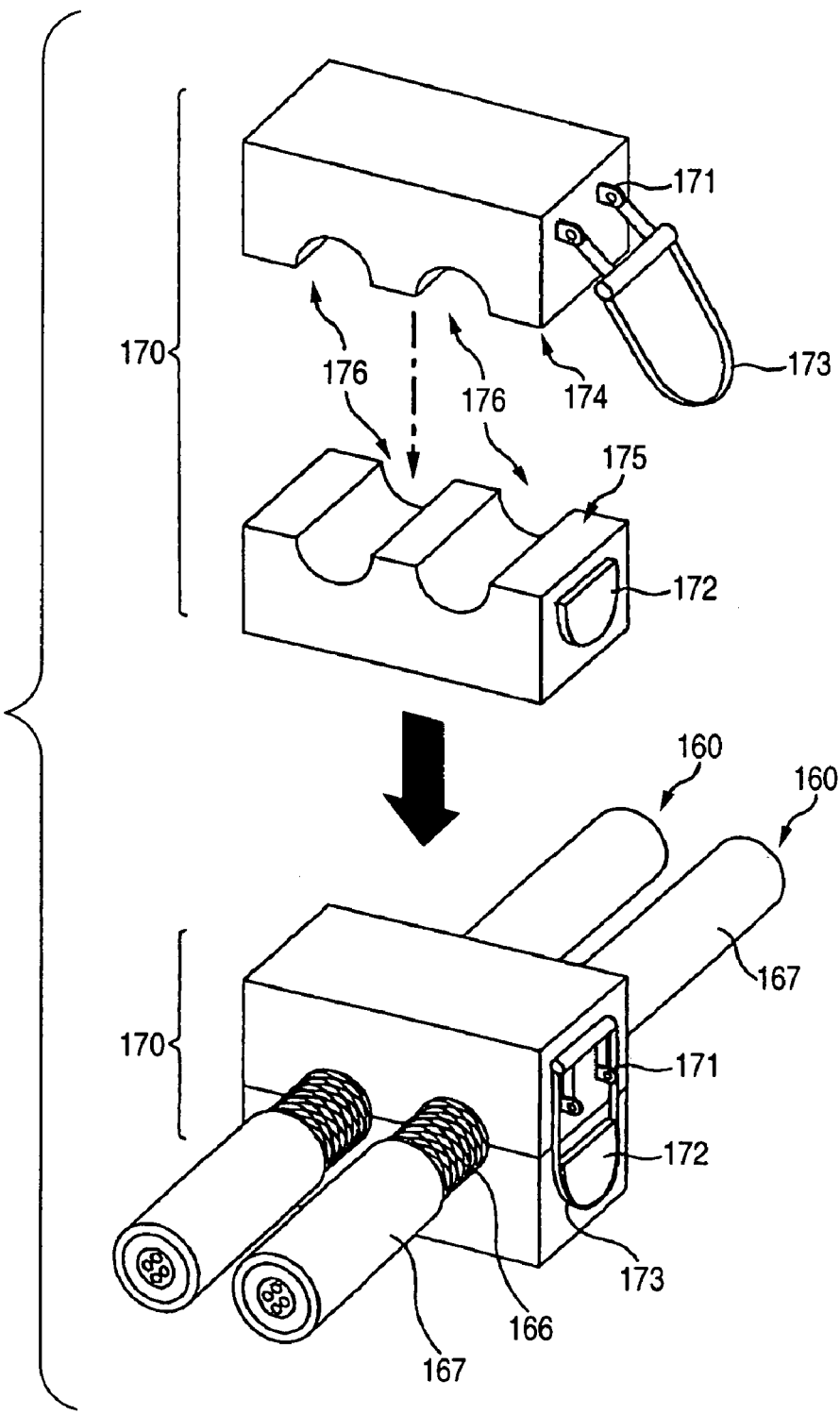
FIG. 16 includes an exploded perspective view and an assembled perspective view showing the state in which frame ground potential is supplied to communication cables in the storage apparatus according to the invention.

FIG. 16 shows a typically one of the frame ground supply parts 170. The frame ground supply part 170 includes a first cable clamping member (a first communication cable clamping part) 171 which has electrical conductivity and a first surface 174, a second cable clamping member (a second communication cable clamping part) 172 which has electrical conductivity and is electrically conductibly connected to at least either the framework 200 of the control section 110 or the framework 200 of any of the drive sections 120 and has a second surface 175. A cable fixing part (a fixing part) 173 fixes the first cable clamping member 171 and the second cable clamping member 172 so that the members 171 and 172 are pressed against each other with the first surface 174 and the second surface 175 facing each other.

Incidentally, the frame ground supply part 170 shown in FIG. 16 is constructed so that the first cable clamping member 171 and the second cable clamping member 172 are separable from each other, but the first cable clamping member 171 and the second cable clamping member 172 may be joined together by hinges or the like.

A method of electrically conductibly connecting the second shields 166 of the respective communication cables 160 to the framework 200 by the use of the frame ground supply part 170 is as follows. Namely, as shown in FIG. 16, each of the communication cables 160 has a portion from which the covering 167 is removed around its periphery, and the portions of the respective communication cables 160 are held by being clamped between the first surface 174 of the first cable clamping member 171 and the second surface 175 of the second cable clamping member 172.

Accordingly, since the second shields 166 are electrically conductibly connected to the frame ground supply part 170, the second shields 166 can be electrically conductibly connected to the framework 200. In addition, since the second shields 166 are electrically conductibly connected to the framework 200, the potential of each of the second shields 166 can be maintained at ground potential, whereby interception of electromagnetic waves can be realized. Accordingly, in the disk array apparatus 100 according to this embodiment of the invention, the effect of interception of electromagnetic waves by the first shield 164 and the effect of interception of electromagnetic waves by the second shield 166 are mutually potentiated, whereby data to be read and written from and to the disk drives 311 can be strongly protected from external electromagnetic waves. At the same time, it is possible to prevent outward leaks of electromagnetic waves generated by communication between the disk adapters 134 and the disk drives 311. Furthermore, the electrical connection between the second shields 166 and the framework 200 can be provided merely by clamping the portions of the communication cables 160 from which the respective coverings 167 are removed, by the use of the frame ground supply part 170, whereby the work of routing the communication cables 160 becomes easy. Accordingly, it is possible to facilitate the manufacture and maintenance of the disk array apparatus 100 and the reduce manufacturing cost. In addition, since the communication cables 160 are clamped by the frame ground supply part 170, it is possible to positively provide electrical connection between the second shields 166 and the framework 200. Accordingly, it is possible to improve the reliability of the disk array apparatus 100.

As shown in FIG. 16, in the frame ground supply part 170 according to this embodiment of the invention, hollow portions 176, each having a shape similar to part of the peripheral shape of the second shield 166, are formed in at least one of the first surface 174 and the second surface 175. This construction makes it possible to increase the area of contact between each of the second shields 166 and the frame ground supply part 170, whereby electric conductivity is improved between the second shield 166 and the framework 200 and the effect of interception of electromagnetic waves by the second shield 166 can be made far stronger.

Figure 17:
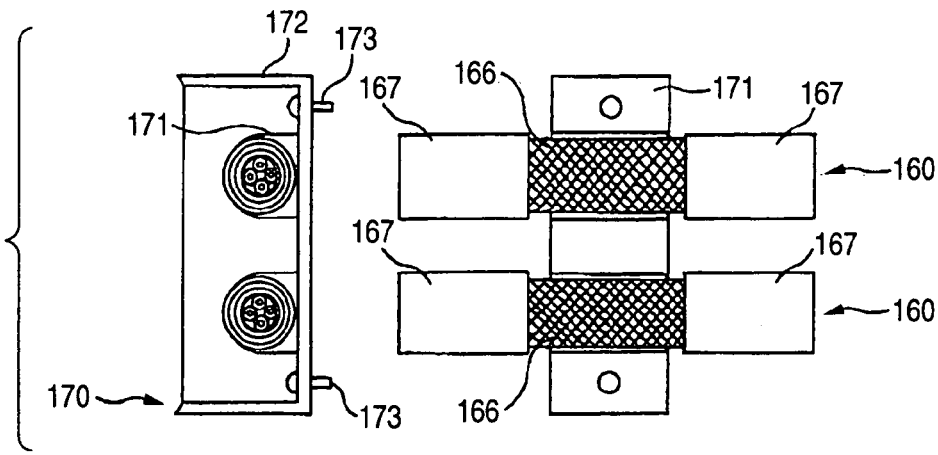
FIG. 17 includes a front view and a side view showing the state in which frame ground potential is supplied to communication cables in the storage apparatus according to the invention.

It is to be noted that the frame ground supply part 170 can also have the structure shown in FIG. 17. Namely, the second surface 175 of the second cable clamping member 172 does not have the hollow portions 176, but the hollow portions 176 are formed on the first surface 174 of the first cable clamping member 171. This structure makes it possible to facilitate manufacture of the frame ground supply parts 170 and reduce the manufacturing cost.

Figure 19:
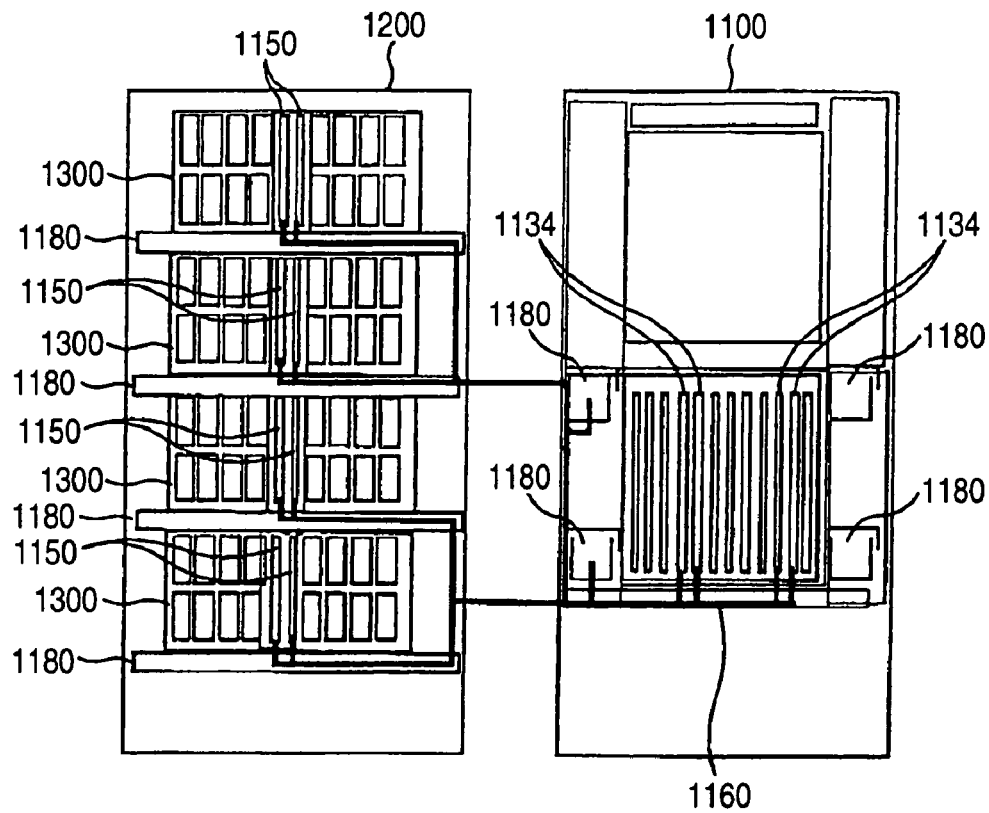
FIG. 19 is a front view showing the external appearance of the connection between disk adapters and hard disk drives according to the invention.
Figure 20:
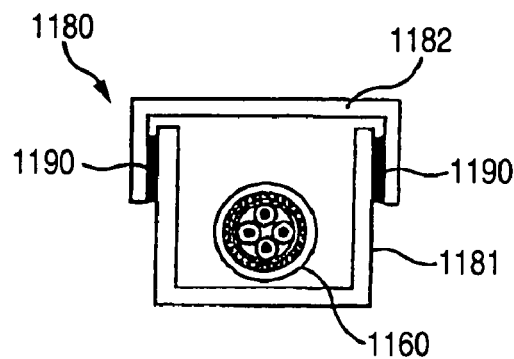
FIG. 20 is a diagram showing the state in which a communication cable is routed in a storage device according to the invention.

Accordingly, in the disk array apparatus 100 according to this embodiment of the invention, it is possible to positively effect interception of electromagnetic waves within each of the communication cables 160, whereby there is no need to provide a special structure for interception of electromagnetic waves. For example, in a disk array apparatus using communication cables 1160 of the type shown in FIG. 18, there is a need for a special structure for interception of electromagnetic waves, as shown in FIGS. 19 and 20.

Figure 18:
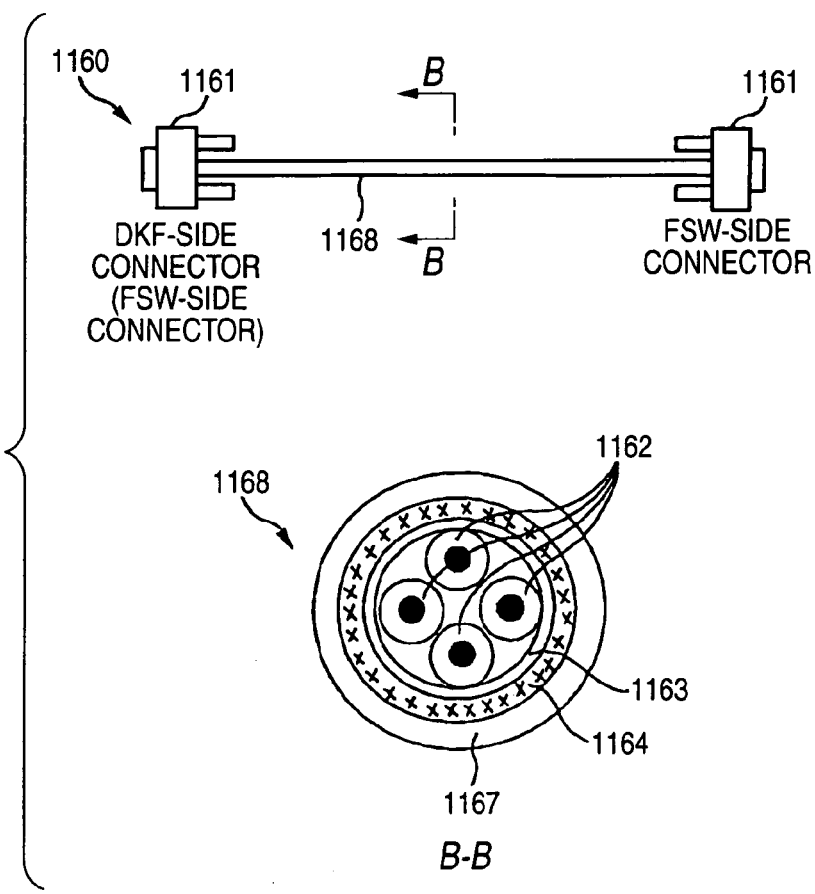
FIG. 18 is a diagram showing a communication cable and a cross-section along line B—B thereof according to the invention.

The communication cable 1160 shown in FIG. 18 has a structure in which a cable 1168 has connectors 1161 at its opposite ends. One of the connectors 1161 is connected to a communication connector of any one of disk adapters 1134, while the other is connected to a connector of any one of FSWs 1150. The cable 1168 has a transmission medium 1162 through which data to be read or written by the connected disk adapter 1134 is to be transmitted, a first shield 1164 which has electrical conductivity and surrounds the transmission medium 1162 with an insulator 1163 interposed therebetween, and an electrically nonconductive covering 1167 which surrounds the first shield 1164.

The first shield 1164 is electrically conductibly connected to pins of the respective connectors 1161 in the inside of the cable 1168. When the communication cable 1160 is connected to connectors of one of the disk adapters 1134 or to connectors of one of the FSWs 1150, the first shield 1164 is electrically conductibly connected to the ground potential supply circuit provided in at least one of the connected disk adapter 1134 and FSW 1150. Accordingly, the potential of the first shield 1164 is maintained at ground potential, whereby interception of electromagnetic waves can be effected.

However, the communication cable 1160 shown in FIG. 18 is not able to intercept electromagnetic waves passing through the first shield 1164. Accordingly, in the control section 1100 and the drive sections 1200, each of which uses the communication cables 1160 of the type shown FIG. 18, the respective communication cables 1160 need to be covered with communication cable holding parts 1180, as shown in FIG. 19 by way of example. FIGS. 20 and 24 show the manner in which one communication cable 1160 is covered with one communication cable holding part 1180.

The communication cable holding part 1180 has a structure in which a communication cable housing part 1181 is covered with an electromagnetic-wave intercepting cover 1182. Furthermore, electromagnetic-wave intercepting sheets 1190 are fitted between the communication cable housing part 1181 and the electromagnetic-wave intercepting cover 1182 in order to prevent electromagnetic waves from leaking or entering through a gap between the communication cable housing part 1181 and the electromagnetic-wave intercepting cover 1182. Each of the communication cable housing part 1181 and the electromagnetic-wave intercepting cover 1182 may be manufactured of a material, such as an electrically conductive metal. The electromagnetic-wave intercepting sheet 1190 may be formed of an elastic material having an electromagnetic-wave absorbing effect, such as urethane. Accordingly, it is possible to intercept electromagnetic waves by covering the communication cable 1160 with the communication cable holding part 1180.

However, in the inside of the disk array apparatus in which electronic devices are disposed at high density and the communication cables 1160 are disposed to reach every location, as shown in FIGS. 10 and 11, it is not necessarily preferable to route the communication cables 1160 covered with the communication cable holding parts 1180, in terms of ease of manufacture as well as maintainability.

Figure 24A:
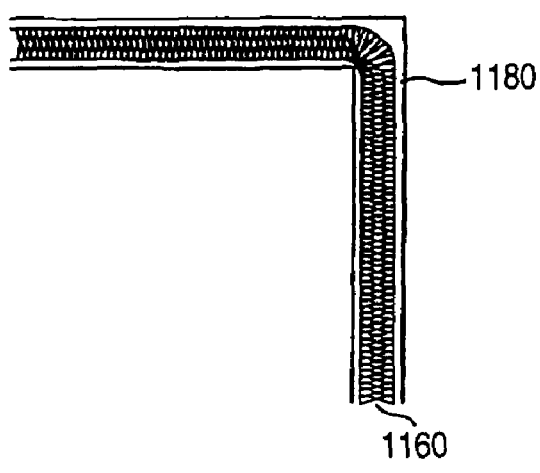
FIG. 24A is a sectional view and FIG. 24B is a perspective view showing the state in which a communication cable is routed in a storage device according to the invention.
Figure 24B:
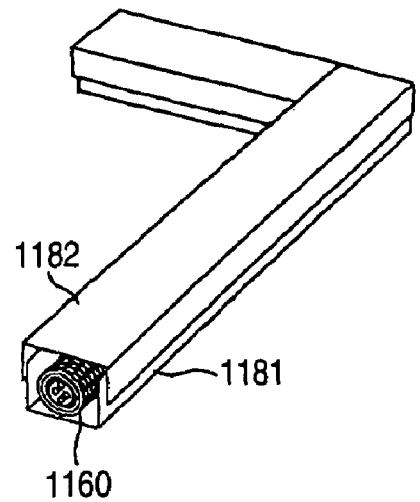

In the inside of the disk array apparatus in particular, if the direction of any of the communication cables 1160 is to be changed, the communication cable 1160 needs to be sharply bent, as shown in FIGS. 24A and 24B, because the number of kinds of electromagnetic-wave intercepting covers 1182 cannot be increased from the point of view of achieving a reduction in the number of component parts.

On the other hand, in the disk array apparatus 100 according to the present invention, since interception of electromagnetic waves can be positively effected within each of the communication cables 160, there is no need to incorporate the above-described special structure for interception of electromagnetic waves.

Figure 21:
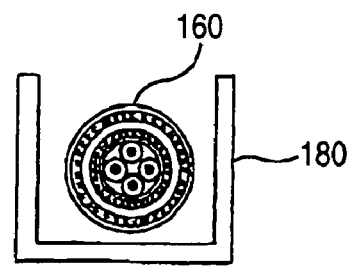
FIG. 21 is a diagram showing the state in which a communication cable is routed in a storage device according to the invention.

For example, a communication cable holding part 180 according to the embodiment of the invention can have the structure shown in FIG. 21. Namely, there is no need to use the electromagnetic-wave intercepting cover 1182 and the electromagnetic-wave intercepting sheets 1190. Accordingly, the communication cable 160 can be easily put into and taken out of the communication cable holding part 180, whereby the routing workability of the communication cables 160 is improved. Accordingly, with respect to the disk array apparatus 100, it is possible to realize simplified manufacture, improved maintainability, reduced manufacturing cost and a reduced number of component parts. Furthermore, it is also possible to reduce the overall size of the disk array apparatus 100.

Figure 25A:
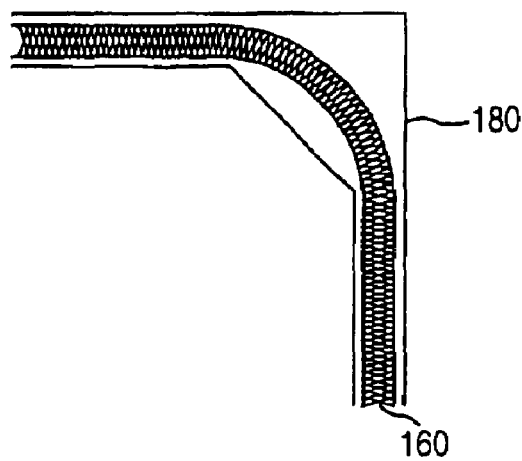
FIG. 25A is a sectional view and FIG. 25B is a perspective view thereof showing the state in which a communication cable is routed in a storage device according to the invention.
Figure 25B:
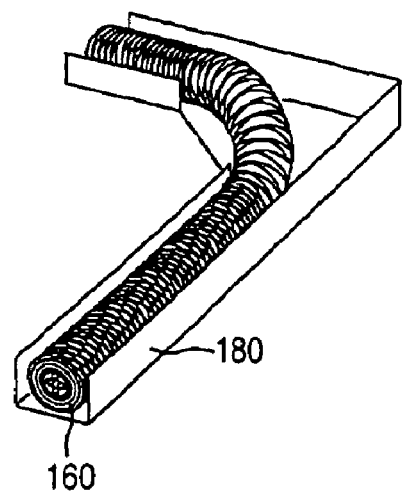

The communication cable holding part 180 according to the present invention does not need the electromagnetic-wave intercepting cover 1182 nor the electromagnetic-wave intercepting sheets 1190. Accordingly, in the case where the communication cable holding part 180 is formed as shown in FIGS. 25A and 25B, by way of example, the communication cable 1160 can be gently bent if the direction of any of the communication cables 1160 needs to be changed in the inside of the disk array apparatus 100. Accordingly, it is possible to realize not only prevention of damage to the communication cables 160, but also restraint of an increase in the electrical resistance of the transmission medium 162, whereby it is also possible to improve the quality of communication signals flowing in the communication cables 160. Because communication speeds specified in the Fibre Channel Standard are high, the restraint of an increase in the electrical resistance of the transmission medium 162 and an improvement in signal quality are extremely important in terms of improvement, in the performance and reliability of the disk array apparatus 100.

(Shielding of Other Parts)

As described previously, in the disk array apparatus 100 according to the present invention, only the communication cables 160 do not generate electromagnetic waves. However, electromagnetic waves are also generated from the channel adapters 131, the FSWs 150, the AC/DC power sources 600 and the like. Accordingly, there is also a need for a structure for intercepting electromagnetic waves radiated from the channel adapters 131, the FSWs 150, the AC/DC power sources 600 and the like.

(Shielding of FSW)

Figure 22:
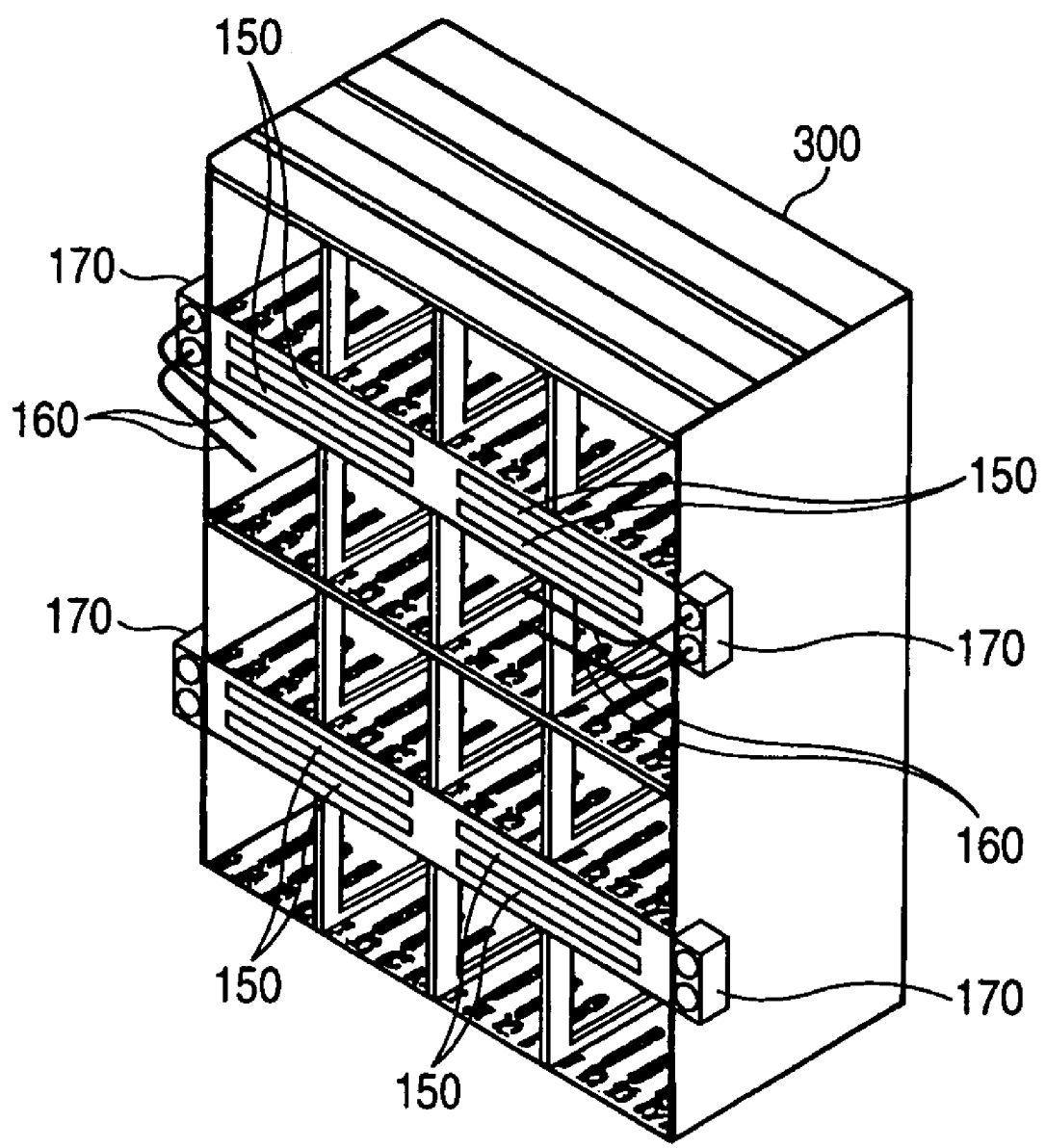
FIG. 22 is a perspective view showing the state in which communication cables are connected to Fibre Channel switches according to the invention.
Figure 23:
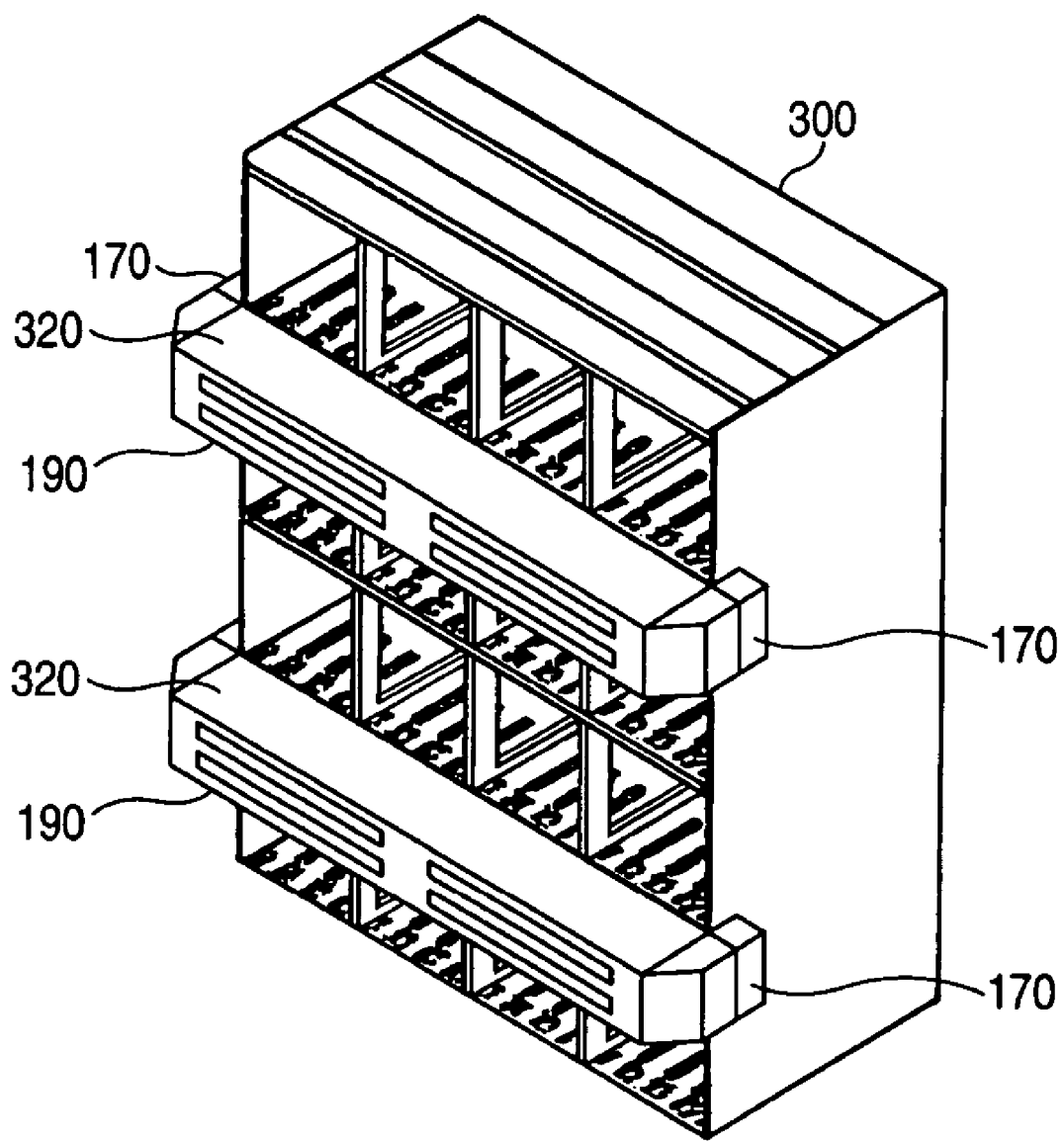
FIG. 23 is a perspective view showing the state in which covers are respectively provided on Fibre Channel switches according to the invention.

FIGS. 22 and 23 show a structure for intercepting electromagnetic waves generated from the FSWs 150.

Specifically, one face of the disk drive module 300 through which the FSWs 150 are to be inserted and removed is provided with Fibre Channel switch covers 320, each of which includes a conductive plate having electrical conductivity and approximately hermetically seals the area of the face of the disk drive module 300 through which the FSWs 150 are to be inserted and removed. Each of the Fibre Channel switch covers 320 may be manufactured of a material such as an electrically conductive metal. In addition, each of the Fibre Channel switch covers 320 may also be provided with an electromagnetic-wave restraining sheet (elastic body) 190 having electrical conductivity, which is disposed to extend along the periphery of the face of the Fibre Channel switch cover 320 that is disposed opposite to the face of the disk drive module 300 through which the FSWs 150 are to be inserted and removed.

Figure 28:
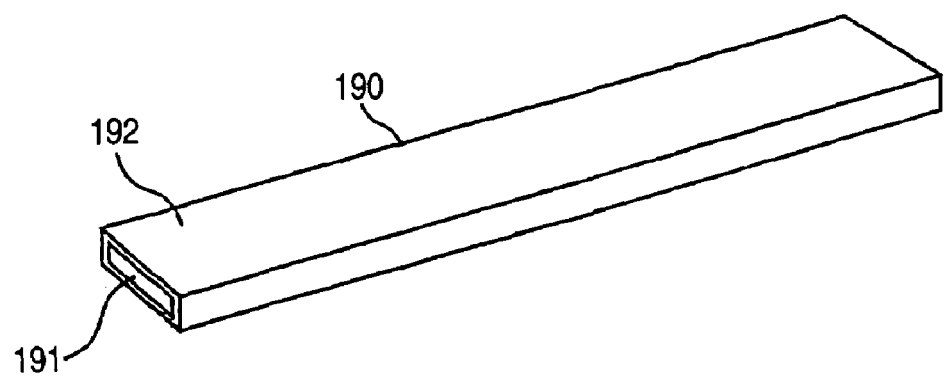
FIG. 28 is a perspective view showing an elastic body having electrical conductivity according to the invention.

The electromagnetic-wave restraining sheet 190 is formed by covering with a nylon coat 192 an elastic body having an electromagnetic-wave absorbing effect, such as a urethane foam 191. An example of the external appearance of the electromagnetic-wave restraining sheet 190 is shown in FIG. 28. This construction makes it possible to prevent electromagnetic waves generated from the FSWs 150 from leaking to the outside. At the same time, it is possible to prevent malfunction or the like of the FSWs 150 from being caused by electromagnetic waves outside the disk array apparatus 100. In addition, it is possible to prevent far more positively any leakage and penetration of electromagnetic waves by sealing the gaps between the Fibre Channel switch covers 320 and the FSWs 150 by means of the electromagnetic-wave restraining sheets 190.

(Shielding of Logical Module)

FIG. 26 shows a structure for intercepting electromagnetic waves generated from the logical modules 400.

Specifically, the faces of the respective logical modules 400 through which the channel adapters 131 and the disk adapters 134 are to be inserted and removed are provided with logical module covers 440, each of which includes a conductive plate having electrical conductivity and approximately hermetically seals the face of a respective one of the logical modules 400 through which the channel adapters 131 and the disk adapters 134 are to be inserted and removed. Each of the logical module covers 440 may be manufactured of a material, such as an electrically conductive metal. In addition, each of the logical module covers 440 may also be provided with electromagnetic-wave restraining sheets (elastic bodies) 190 having electrical conductivity, which are arranged to surround the periphery of the face of each of the logical module covers 440 that is opposite to the face of the corresponding logical module 400 through which the channel adapters 131 and the disk adapters 134 are to be inserted and removed.

Each of the electromagnetic-wave restraining sheets 190 is formed by covering with the nylon coat 192 an elastic body having an electromagnetic-wave absorbing effect, such as the urethane foam 191. This construction makes it possible to prevent electromagnetic waves generated from the disk adapters 134, the channel adapters 131 and the like from leaking to the outside of the disk array apparatus 100. At the same time, it is possible to prevent malfunction or the like of the channel adapters 131 and the disk adapters 134 from being caused by electromagnetic waves outside the disk array apparatus 100. In addition, it is possible to prevent far more positively any leakage and penetration of electromagnetic waves by sealing the gaps between the logical module covers 440 and the logical modules 400 by means of the electromagnetic-wave restraining sheets 190.

(Shielding of Control Section and Drive Section)

Figure 27:
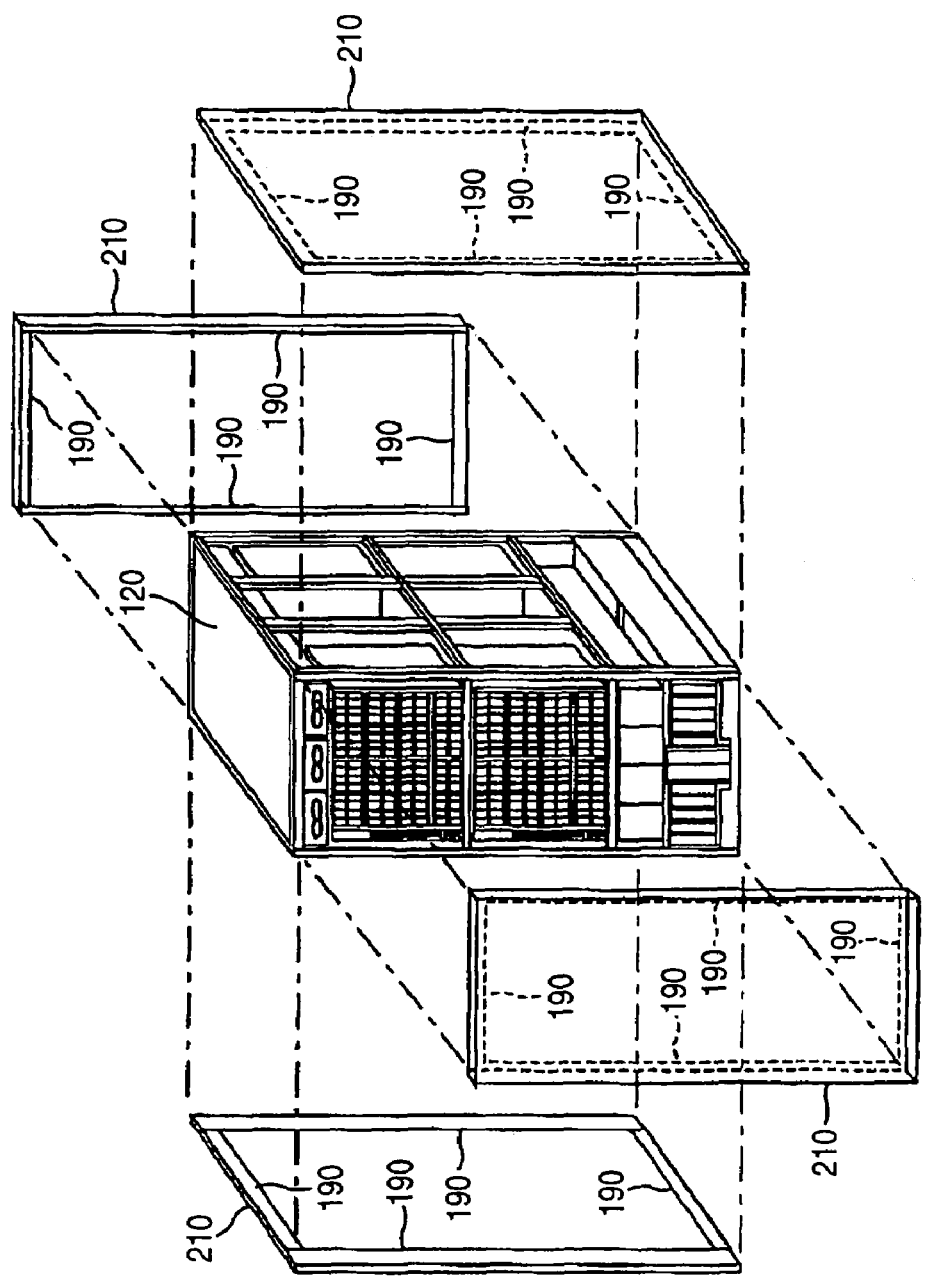
FIG. 27 is a developed perspective view showing the state in which rack covers are provided on one of the drive sections according to the invention.
Figure 31:
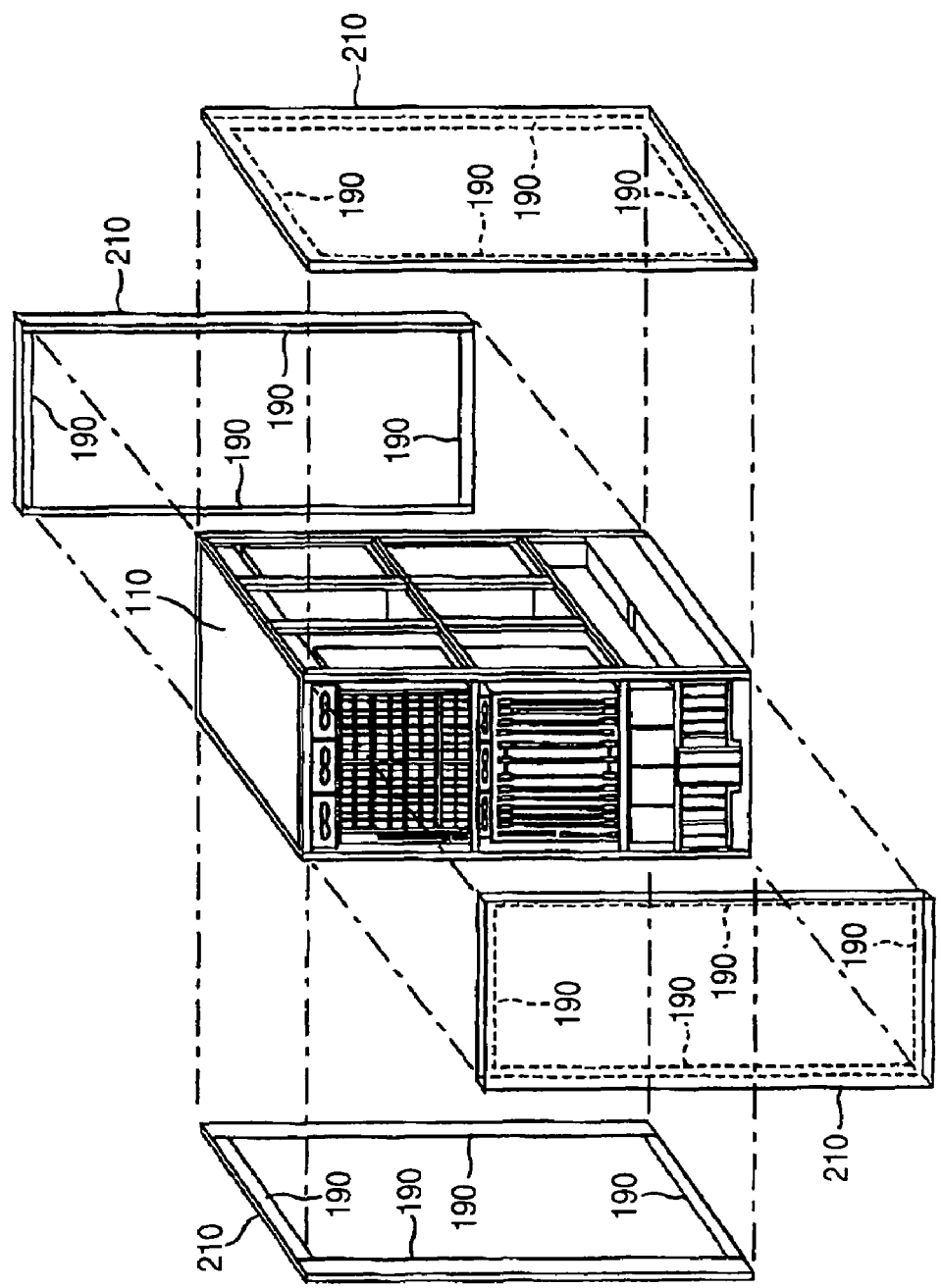
FIG. 31 is a developed perspective view showing the state in which rack covers are provided on the control section according to the invention.

FIG. 31 shows a structure for intercepting electromagnetic waves generated from the control section 110. FIG. 27 shows a structure for intercepting electromagnetic waves generated from each of the drive sections 120. The control section 110 and the drive sections 120 emit electromagnetic waves generated by, for example, the AC/DC power sources 600. There is also a case where small quantities of electromagnetic waves leak from the communication cables 160.

Each of the frameworks 200 of the control section 110 and the drive sections 120 has at least four faces respectively provided with framework panels 210 which respectively include conductive plates having electrical conductivity, and each of the frameworks 200 of the control section 110 and the drive sections 120 is approximately hermetically sealed by the framework panels 210.

Each of the framework panels 210 may be manufactured of a material such as an electrically conductive metal plate. In addition, each of the framework panels 210 may also be provided with electromagnetic-wave restraining sheets (elastic bodies) 190 having electrical conductivity, and the electromagnetic-wave restraining sheets 190 are disposed to surround the periphery of each of the framework panels 210 that are respectively opposed to respective faces of the framework 200 of any one of the control section 110 and the drive sections 120. This construction makes it possible to prevent electromagnetic waves generated from the AC/DC power sources 600, the communication cables 160 and the like from leaking to the outside of the disk array apparatus 100. At the same time, it is possible to prevent electromagnetic waves outside the disk array apparatus 100 from causing malfunctions or the like of the AC/DC power sources 600 and from affecting data input/output signals flowing in the communication cables 160. In addition, it is possible to prevent far more positively any leakage and penetration of electromagnetic waves by sealing the gaps between the framework panels 210 and each of the frameworks 200 by means of the electromagnetic-wave restraining sheets 190.

As described hereinabove, in the disk array apparatus 100 according to the present invention, electromagnetic waves generated from the transmission media 162 of the respective communication cables 160 by communications between the disk adapters 134 and the disk drives 311 can be prevented from leaking to the outside of the communication cables 160. Accordingly, it is possible to prevent leakage of electromagnetic waves from the disk array apparatus 100. In addition, it is also possible to prevent electromagnetic waves emitted from electronic devices outside the disk array apparatus 100 from entering the inside of any of the communication cables 160. Accordingly, it is possible to improve the reliability of communications between the disk adapters 134 and the disk drives 311.

In addition, since interception of electromagnetic waves is effected between the inside and the outside of each of the communication cables 160, the frameworks 200 of the disk array apparatus 100 do not need to have a special structure for intercepting electromagnetic waves. Furthermore, since there is no leakage of electromagnetic waves from the communication cables 160, a structure for intercepting electromagnetic waves leaking from the communication cables 160 does not need to be provided in the disk array apparatus 100. Accordingly, it is possible to increase the degree of freedom of routing of the communication cables 160 in the disk array apparatus 100. Accordingly, in the disk array apparatus 100 according to the present invention, it is possible to realize simplified manufacture, simplified maintenance, reduced manufacturing cost and a reduced number of component parts, while strengthening the interception of electromagnetic waves.

Furthermore, in the disk array apparatus 100 according to the present invention, the Fibre Channel switch covers 320 are respectively provided on the portions of the disk drive modules 300 in which the FSWs 150 are housed. In addition, the faces of the respective logical modules 400 through which the channel adapters 131 and the disk adapters 134 are to be inserted and removed are provided with the logical module covers 440, each of which includes a conductive plate having electrical conductivity and approximately hermetically seals the face of a respective one of the logical modules 400 through which the channel adapters 131 and the disk adapters 134 are to be inserted and removed. In addition, each of the frameworks 200 of the control section 110 and the drive sections 120 has at least four faces respectively provided with the framework panels 210, which respectively include conductive plates having electrical conductivity, and each of the frameworks 200 of the control section 110 and the drive sections 120 are approximately hermetically sealed by the framework panels 210. In this manner, the disk array apparatus 100 according to the present invention is capable of intercepting electromagnetic waves far more strongly and positively.

While preferred embodiments of the invention have been described hereinabove, the above-described embodiments have been referred to for ease of understanding of the invention, but are not to be construed as limiting the invention. To the contrary, the invention can be variously modified and improved without departing from its spirit and scope, and encompasses all equivalents.

What is claimed is:

1. A storage apparatus comprising:
    a storage control section including a first rack having electrical conductivity, channel control parts housed in the first rack, and disk control parts housed in the first rack,
    the channel control parts being communicably connected to an information processing apparatus and constructed to receive a data input/output request from the information processing apparatus,
    the disk control parts being communicably connected to hard disk drives for storing data and constructed to perform read/write of data from and to the hard disk drives in response to a data input/output request from the information processing apparatus;
    a storage drive section including a second rack having electrical conductivity, the hard disk drives, and relay parts for relaying communications between the hard disk drives and the disk control parts, the hard disk drives and the relay parts being housed in the second rack; and
    communication cables for communicably connecting the disk control parts to the relay parts, each of the communication cables including a transmission medium through which to transmit data to be read or written by the disk control parts, a first conductor having electrical conductivity and surrounding the transmission medium with an insulator interposed therebetween, a second conductor having electrical conductivity and surrounding the first conductor with an insulator interposed therebetween, and an electrically nonconductive covering surrounding the second conductor,
    the first conductor being electrically conductibly connected to ground potential supply circuits provided in at least either the disk control parts or the relay parts,
    the second conductor being electrically conductibly connected to at least one of the first rack and the second rack.

2. A storage apparatus according to claim 1 further comprising a ground potential supply part including a first communication cable clamping part which has electrical conductivity and a first surface, a second communication cable clamping part which has electrical conductivity and is electrically conductibly connected to at least either the first rack or the second rack and has a second surface, and a fixing part which fixes the first communication cable clamping part and the second communication cable clamping part so that the first and second communication cable clamping parts are pressed against each other with the first surface and the second surface facing each other,
    each of the communication cables having a portion from which the covering is removed around its periphery,
    the portion of each of the communication cables being held by being clamped between the first surface of the first communication cable clamping part and the second surface of the second communication cable clamping part.

3. A storage apparatus according to claim 2, wherein a hollow portion having a shape similar to part of a peripheral shape of the second conductor is formed in at least one of the first surface and the second surface.

4. A storage apparatus according to claim 2, wherein:
    the first rack and the second rack are approximately rectangular parallelepipedic;
    the storage control section includes the first rack and an approximately rectangular parallelepipedic control box which has electrical conductivity and in which the channel control parts and the disk control parts are housed in a removably inserted state, the control box being housed in the first rack in a state electrically conductible to the first rack;
    the storage drive section includes the second rack and an approximately rectangular parallelepipedic disk box which has electrical conductivity and in which the relay parts and the hard disk drives are housed in a removably inserted state, the disk box being housed in the second rack in a state electrically conductible to the second rack; and
    the ground potential supply part is provided in a state electrically conductible to at least one of the control box and the disk box.

5. A storage apparatus according to claim 1, wherein each of the first rack and the second rack is approximately rectangular parallelepipedic and has at least four faces respectively provided with rack covers which respectively include conductive plates having electrical conductivity and approximately hermetically seal each of the first rack and the second rack.

6. A storage apparatus according to claim 5, wherein the rack covers are respectively provided with elastic bodies having electrical conductivity, each of the elastic bodies being disposed to extend along a periphery of a face of a respective one of the rack covers, the face being opposed to any one of the respective faces of either one of the first rack and the second rack.

7. A storage apparatus according to claim 1, wherein:
    the first rack and the second rack are approximately rectangular parallelepipedic;
    the storage control section includes the first rack and an approximately rectangular parallelepipedic control box which has electrical conductivity and in which the channel control parts and the disk control parts are housed in a removably inserted state, the control box being housed in the first rack in a state electrically conductible to the first rack;

the storage drive section includes the second rack and an approximately rectangular parallelepipedic disk box which has electrical conductivity and in which the relay parts and the hard disk drives are housed in a removably inserted state, the disk box being housed in the second rack in a state electrically conductible to the second rack; and a face of the control box through which the channel control parts and the disk control parts are to be inserted and removed is provided with a control box cover which includes a conductive plate having electrical conductivity and approximately hermetically seals the face of the control box through which the channel control parts and the disk control parts are to be inserted and removed.

8. A storage apparatus according to claim 7, wherein the control box cover is provided with an elastic body having electrical conductivity, the elastic body being arranged to surround a periphery of a face of the control box, the face being opposite to the face of the control box through which the channel control parts and the disk control parts are to be inserted and removed.

9. A shielding method for a storage apparatus including a storage control section including a first rack having electrical conductivity, channel control parts housed in the first rack, and disk control parts housed in the first rack, the channel control parts being communicably connected to an information processing apparatus and constructed to receive a data input/output request from the information processing apparatus, the disk control parts being communicably connected to hard disk drives for storing data and constructed to perform read/write of data from and to the hard disk drives in response to a data input/output request from the information processing apparatus, and a storage drive section including a second rack having electrical conductivity, the hard disk drives, and relay parts for relaying communications between the hard disk drives and the disk control parts, the hard disk drives and the relay parts being housed in the second rack, the shielding method comprising the steps of:

communicably connecting the disk control parts and the relay parts via communication cables each including a transmission medium through which to transmit data to be read or written by the disk control parts, a first conductor having electrical conductivity and surrounding the transmission medium with an insulator interposed therebetween, a second conductor having electrical conductivity and surrounding the first conductor with an insulator interposed therebetween, and an electrically nonconductive covering surrounding the second conductor;

electrically conductibly connecting the first conductor to ground potential supply circuits provided in at least either the disk control parts or the relay parts; and electrically conductibly connecting the second conductor to at least one of the first rack and the second rack.

10. A shielding method for a storage apparatus according to claim 9, wherein the storage apparatus further includes a ground potential supply part including a first communication cable clamping part which has electrical conductivity and a first surface, a second communication cable clamping part which has electrical conductivity and is electrically conductibly connected to at least either the first rack or the second rack and has a second surface, and a fixing part which fixes the first communication cable clamping part and the second communication cable clamping part so that the first and second communication cable clamping parts are pressed against each other with the first surface and the second surface facing each other, each of the communication cables having a portion from which the covering is removed around its periphery, the portion of each of the communication cables being held by being clamped between the first surface of the first communication cable clamping part and the second surface of the second communication cable clamping part.

11. A shielding method for a storage apparatus according to claim 10, wherein a hollow portion having a shape similar to part of a peripheral shape of the second conductor is formed in at least one of the first surface and the second surface.

12. A shielding method for a storage apparatus according to claim 10, wherein:

the first rack and the second rack are approximately rectangular parallelepipedic;

the storage control section includes the first rack and an approximately rectangular parallelepipedic control box which has electrical conductivity and in which the channel control parts and the disk control parts are housed in a removably inserted state, the control box being housed in the first rack in a state electrically conductible to the first rack;

the storage drive section includes the second rack and an approximately rectangular parallelepipedic disk box which has electrical conductivity and in which the relay parts and the hard disk drives are housed in a removably inserted state, the disk box being housed in the second rack in a state electrically conductible to the second rack; and the ground potential supply part is provided in a state electrically conductible to at least one of the control box and the disk box.

13. A shielding method for a storage apparatus according to claim 9, wherein each of the first rack and the second rack is approximately rectangular parallelepipedic and has at least four faces respectively provided with rack covers which respectively include conductive plates having electrical conductivity and approximately hermetically seal each of the first rack and the second rack.

14. A shielding method for a storage apparatus according to claim 13, wherein the rack covers are respectively provided with elastic bodies having electrical conductivity, each of the elastic bodies being disposed to extend along a periphery of a face of a respective one of the rack covers, the face being opposed to any one of the respective faces of either one of the first rack and the second rack.

15. A shielding method for a storage apparatus according to claim 9, wherein:

the first rack and the second rack are approximately rectangular parallelepipedic;

the storage control section includes the first rack and an approximately rectangular parallelepipedic control box which has electrical conductivity and in which the channel control parts and the disk control parts are housed in a removably inserted state, the control box being housed in the first rack in a state electrically conductible to the first rack;

the storage drive section includes the second rack and an approximately rectangular parallelepipedic disk box which has electrical conductivity and in which the relay parts and the hard disk drives are housed in a removably inserted state, the disk box being housed in the second rack in a state electrically conductible to the second rack; and a face of the control box through which the channel control parts and the disk control parts are to be inserted and removed is provided with a control box cover which includes a conductive plate having electrical conductivity and approximately hermetically seals the face of the control box through which the channel control parts and the disk control parts are to be inserted and removed.

16. A shielding method for a storage apparatus according to claim 15, wherein the control box cover is provided with an elastic body having electrical conductivity, the elastic body being arranged to surround a periphery of a face of the control box, the face being opposite to the face of the control box through which the channel control parts and the disk control parts are to be inserted and removed.

* * * * *